United States Patent
Woo et al.

(10) Patent No.: US 11,275,478 B2
(45) Date of Patent: Mar. 15, 2022

(54) METHOD, ELECTRONIC DEVICE, AND STORAGE MEDIUM FOR CHANGING OPERATION MODE ON BASIS OF BENDING INFORMATION USING SENSING CIRCUIT

(71) Applicant: Samsung Electronics Co., Ltd., Gyeonggi-do (KR)

(72) Inventors: Jeong Woo, Gyeonggi-do (KR); Seungwon Oh, Gyeonggi-do (KR); Soyoung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/966,985

(22) PCT Filed: Feb. 21, 2019

(86) PCT No.: PCT/KR2019/002133
§ 371 (c)(1),
(2) Date: Aug. 3, 2020

(87) PCT Pub. No.: WO2019/168299
PCT Pub. Date: Sep. 6, 2019

(65) Prior Publication Data
US 2021/0048926 A1 Feb. 18, 2021

(30) Foreign Application Priority Data
Feb. 27, 2018 (KR) .......................... 10-2018-0023597

(51) Int. Cl.
*G06F 3/044* (2006.01)
*G06F 3/041* (2006.01)

(52) U.S. Cl.
CPC .......... *G06F 3/0447* (2019.05); *G06F 3/0414* (2013.01); *G06F 3/04164* (2019.05); *G06F 2203/04106* (2013.01)

(58) Field of Classification Search
CPC .......................... G06F 3/0447; G06F 3/04164
See application file for complete search history.

(56) References Cited

U.S. PATENT DOCUMENTS

| 2006/0118625 A1 | 6/2006 | Sekita | |
| 2010/0311494 A1* | 12/2010 | Miller | G07F 17/3223 463/22 |

(Continued)

FOREIGN PATENT DOCUMENTS

| EP | 1667057 A2 | 6/2006 |
| JP | 2006-165805 A | 6/2006 |

(Continued)

OTHER PUBLICATIONS

European Search Report dated Mar. 2, 2021.
Korean Search Report dated Jan. 21, 2022.

*Primary Examiner* — Chun-Nan Lin
(74) *Attorney, Agent, or Firm* — Cha & Reiter, LLC.

(57) ABSTRACT

According to various embodiments, an electronic device comprises: a housing; a sensing circuit; a processor operatively connected to the sensing circuit; and a memory operably connected to the processor, wherein the memory can store instructions that when executed, cause the processor to: identify output values of the sensing circuit associated with a touch or a pressure applied to the sensing circuit; when at least a portion of the output values are changed, obtain bending information of the sensing circuit at least on the basis of the changed output values; and control to change an operation mode of the electronic device to at least one of specified operation modes at least on the basis of the bending information of the sensing circuit. Other embodiments are possible.

15 Claims, 23 Drawing Sheets

(56) References Cited

U.S. PATENT DOCUMENTS

| | | | |
|---|---|---|---|
| 2013/0127606 A1* | 5/2013 | Chang | G09G 3/006 340/384.7 |
| 2013/0278498 A1* | 10/2013 | Jung | G06F 3/04144 345/156 |
| 2014/0078047 A1* | 3/2014 | Seo | G06F 3/0412 345/156 |
| 2014/0132553 A1 | 5/2014 | Park et al. | |
| 2015/0097755 A1* | 4/2015 | Kim | G06F 1/1641 345/1.3 |
| 2015/0116608 A1 | 4/2015 | Jeong | |
| 2016/0299579 A1* | 10/2016 | Kim | G06F 1/1626 |
| 2017/0097721 A1 | 4/2017 | Wang | |
| 2017/0115801 A1* | 4/2017 | Shih | G06F 3/04164 |
| 2017/0153748 A1* | 6/2017 | Choi | G06F 3/0446 |
| 2018/0039368 A1 | 2/2018 | Choi et al. | |
| 2018/0348943 A1* | 12/2018 | Yoon | H03K 17/975 |
| 2020/0387279 A1* | 12/2020 | Kim | G06F 3/0488 |

FOREIGN PATENT DOCUMENTS

| | | |
|---|---|---|
| KR | 10-2013-0057029 A | 5/2013 |
| KR | 10-2013-0117499 A | 10/2013 |
| KR | 10-2014-0036499 A | 3/2014 |
| KR | 10-2014-0062269 A | 5/2014 |
| KR | 10-2015-0040553 A | 4/2015 |
| KR | 10-2015-0048348 A | 5/2015 |
| KR | 10-1524949 B1 | 6/2015 |
| KR | 10-2018-0014575 A | 2/2018 |
| KR | 10-2018-0015352 A | 2/2018 |

\* cited by examiner

METHOD, ELECTRONIC DEVICE, AND STORAGE MEDIUM FOR CHANGING OPERATION MODE ON BASIS OF BENDING INFORMATION USING SENSING CIRCUIT

CROSS-REFERENCE TO RELATED APPLICATION(S)

This application is a National Phase Entry of PCT International Application No. PCT/KR2019/002133, which was filed on Feb. 21, 2019, and claims priority to Korean Patent Application No. 10-2018-0023597, which was filed on Feb. 27, 2018, the content of each of which are incorporated herein by reference.

TECHNICAL FIELD

Various embodiments relate to a method, an electronic device, and a storage medium for changing an operation mode based on bending information using a sensing circuit.

BACKGROUND ART

A display mounted on an electronic device may provide various visual information to a user by outputting contents such as a character, an image, etc. Recently, with development of an entertainment function or a multimedia function of the electronic device, users desire an electronic device easy to carry while preferring an electronic device having a large-size display. Reflecting reality, transformable electronic devices such as a flexible (or foldable) electronic device, a rollable electronic device, etc., have been recently developed.

DETAILED DESCRIPTION OF THE INVENTION

Technical Problem

On an electronic device such as a flexible (or foldable) electronic device, a rollable electronic device, etc., various sensors for sensing bending of the electronic device may be attached. For example, a pressure sensor may be attached on the electronic device to sense bending of the electronic device based on an output value of the pressure sensor.

The electronic device having attached thereto a conventional pressure sensor may have an increased thickness.

Depending on a type of the pressure sensor attached to the electronic device, the electronic device may need an additional integrated circuit (IC) for driving the pressure sensor, increasing circuit complexity in the electronic device.

According to various embodiments, there are provided an electronic device that functions as a pressure sensor capable of sensing a pressure applied to the electronic device using a conventional touchscreen and a method for controlling the electronic device.

According to various embodiments, bending information of an electronic device may be obtained using a conventional touchscreen, and an operation of the electronic device may be controlled based on the bending information.

Technical Solution

According to various embodiments, an electronic device includes a housing, a sensing circuit, a processor operatively connected with the sensing circuit, and a memory operatively connected with the processor, in which the memory stores instructions, when executed, configured to cause the processor to identify output values of the sensing circuit related to a touch or a pressure applied to the sensing circuit, to obtain, when at least some of output values are changed, bending information of the sensing circuit at least based on the changed output values, and to change an operation mode of the electronic device to at least one of designated operation modes, at least based on the bending information of the sensing circuit.

According to various embodiments, a method for changing an operation mode based on bending information using a sensing circuit includes identifying output values of the sensing circuit related to a touch or a pressure applied to the sensing circuit of an electronic device, obtaining, when at least some of output values are changed, bending information of the sensing circuit at least based on the changed output values, and changing an operation mode of the electronic device to at least one of designated operation modes, at least based on the bending information of the sensing circuit.

According to various embodiments, in a storage medium having stored therein instructions which cause, when executed by at least one circuit, the at least one circuit to perform at least one operation, the at least one operation includes identifying output values of the sensing circuit related to a touch or a pressure applied to the sensing circuit of an electronic device, obtaining, when at least some of output values are changed, bending information of the sensing circuit at least based on the changed output values, and changing an operation mode of the electronic device to at least one of designated operation modes, at least based on the bending information of the sensing circuit.

Advantageous Effects

A method, an electronic device, and a storage medium for changing an operation mode based on bending information by using a sensing circuit according to various embodiments may provide a function of a pressure sensor capable of sensing a pressure applied to the electronic device by using a conventional touch screen. For example, the electronic device may sense the pressure applied to the electronic device according to bending of the electronic device, by using the touch screen.

A method, an electronic device, and a storage medium for changing an operation mode based on bending information by using a sensing circuit according to various embodiments may obtain the bending information of the electronic device by using a conventional touch screen, and control an operation of the electronic device based on the bending information.

MODE FOR CARRYING OUT THE INVENTION

Figure 1:
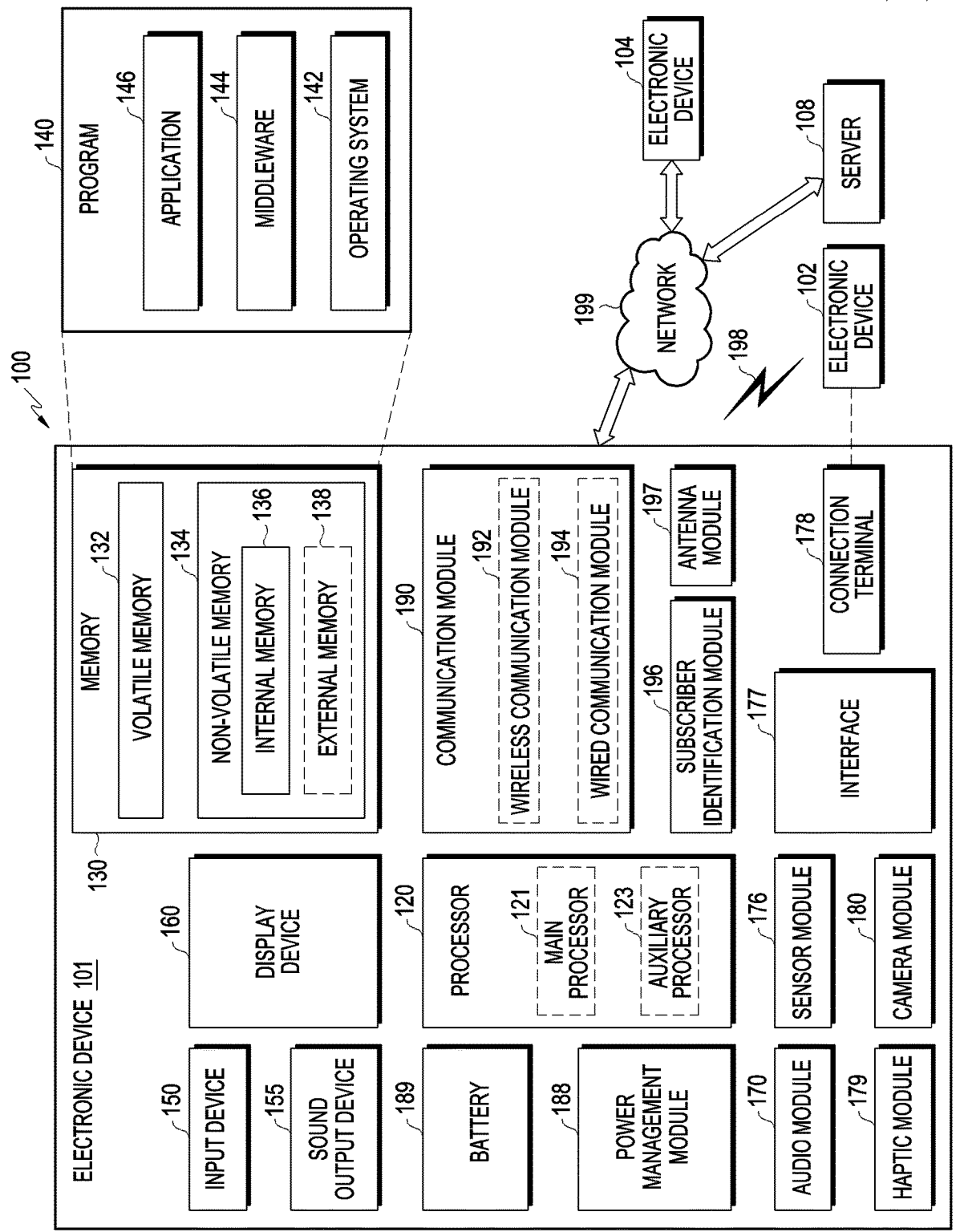
FIG. 1 is a block diagram of an electronic device in a network environment to change an operation mode based on bending information using a sensing circuit, according to various embodiments.

FIG. 1 is a block diagram of an electronic device 101 in a network environment 100 to change an operation mode based on bending information using a sensing circuit, according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 1701, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, the electronic device 101 may include a housing, a sensing circuit (e.g., the display device 160), the processor 120 operatively connected with the sensing circuit, and the memory 130 operatively connected with the processor 120, in which the memory 130 stores instructions, when executed, configured to cause the processor 120 to identify output values of the sensing circuit related to a touch or a pressure applied to the sensing circuit, to obtain, when at least some of output values are changed, bending information of the sensing circuit at least based on the changed output values, and to change an operation mode of the electronic device to at least one of designated operation modes, at least based on the bending information of the sensing circuit.

According to various embodiments, the instructions is configured to cause the processor to, when sensing a change in the at least some of the output values of the sensing circuit, determine, at least based on a designated criterion, the changed output values as information of a pressure input to the sensing circuit or information of a touch input to the sensing circuit.

According to various embodiments, the designated criterion may include at least one of a magnitude of the changed output values, the number of changed output values, a position of the sensing circuit from which the changed output values are output, an area of a region of the sensing circuit from which the changed output values are output, or a shape of the region of the sensing circuit from which the changed output values are output.

According to various embodiments, the instructions is configured to cause the processor to, when a range of output values corresponding to a designated region of the sensing circuit is changed to a designated first range, determine that a pressure at least based on the output values of the first range is applied to the sensing circuit.

According to various embodiments, the instructions is configured to cause the processor to, when sensing a change in first output values corresponding to the designated region, after determining that the pressure at least based on the output values of the first range is applied to the sensing circuit, change a designated operation mode of the electronic device based on the changed first output values.

According to various embodiments, the bending information of the touch screen may include at least one of a bending position, a bending strength, a bending angle, a bending direction, or a bending area.

According to various embodiments, the memory may store a bending angle of the sensing circuit, which corresponds to each of magnitudes of the changed output values.

According to various embodiments, the instructions is configured to cause the processor to change an operation mode of the electronic device to at least one of a sleep mode, a dual display mode, a typing mode, or a wake-up mode, at least based on the bending information of the touch circuit.

According to various embodiments, the electronic device may further include one or more antennas, and the instructions is configured to cause the processor to switch a first connection contact point of a circuit connected with the at least one antenna to a second connection contact point.

According to various embodiments, the electronic device may further include a plurality of antennas, in which the instructions cause the processor to change from a mode in which a first antenna among the plurality of antennas operates to a mode in which a second antenna among the plurality of antennas operates.

According to various embodiments, output values of the sensing circuit may include output values based on a capacitance sensing scheme.

According to various embodiments, a plurality of conductive lines in a first direction, disposed in a designated bending region of the sensing circuit, may be disposed with a space narrower than a plurality of conductive lines in the first direction, disposed in regions of the sensing circuit other than the bending region.

FIG. 2 is a diagram for describing various sensing circuits.

Referring to FIG. 2, the sensing circuit may include a strain gauge pressure sensor, a piezoelectric sensor, an inductance type sensor, a capacitive type sensor, etc.

Figure 2A:
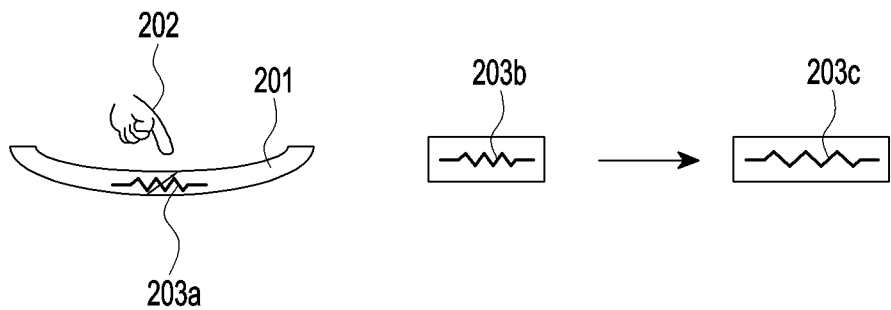
FIG. 2 is a diagram for describing various sensing circuits.

Referring to FIG. 2(a), the strain gauge pressure sensor may measure transformation when an object 201 is transformed by an external force 202. For example, the strain gauge pressure sensor may measure transformation of a resistance wire 302a of the strain gauge pressure sensor. When a resistance wire 203b having a first length of the strain gauge pressure sensor is transformed in a tensile direction, the length increases, causing transformation into a resistance wire 203c having a second length and thus increasing an electric resistance of the resistance wire 203c having a reduced cross-sectional area. The electronic device may sense a pressure by measuring an increase in the electric resistance.

Figure 2B:
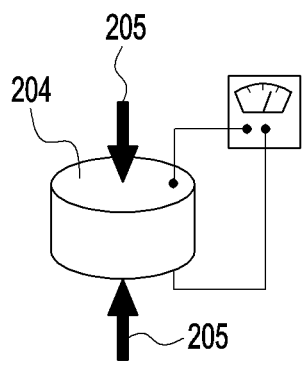

Referring to FIG. 2(b), the piezoelectric sensor may include a piezoelectric element 204 including crystal, potassium sodium tartrate, barium titanite, etc. Upon application of a pressure 205 to the piezoelectric element 204 of the piezoelectric sensor, the piezoelectric sensor may generate a voltage that is proportional to the pressure 205. The electronic device may sense a pressure by measuring the voltage.

Figure 2C:
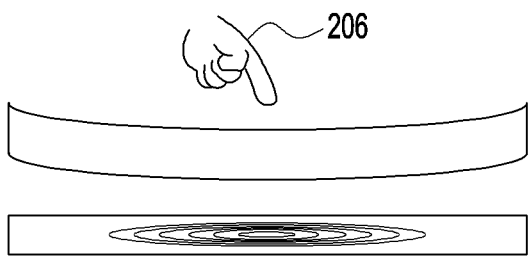

Referring to FIG. 2(c), the inductance sensor may sense an inductance change, when sensing a user's pressure 206. The electronic device may sense the pressure based on the inductance change.

Figure 2D:
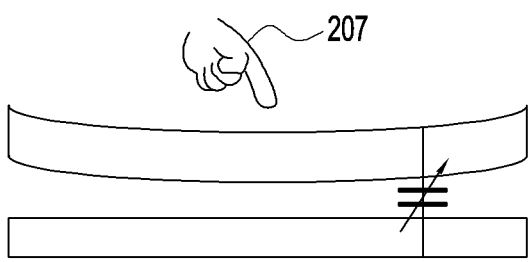

Referring to FIG. 2(d), the capacitance sensor may sense a capacitance change with respect to a change in a distance between two electrodes, when sensing a user's pressure 207. The electronic device may sense the pressure based on the inductance change.

Figure 3:
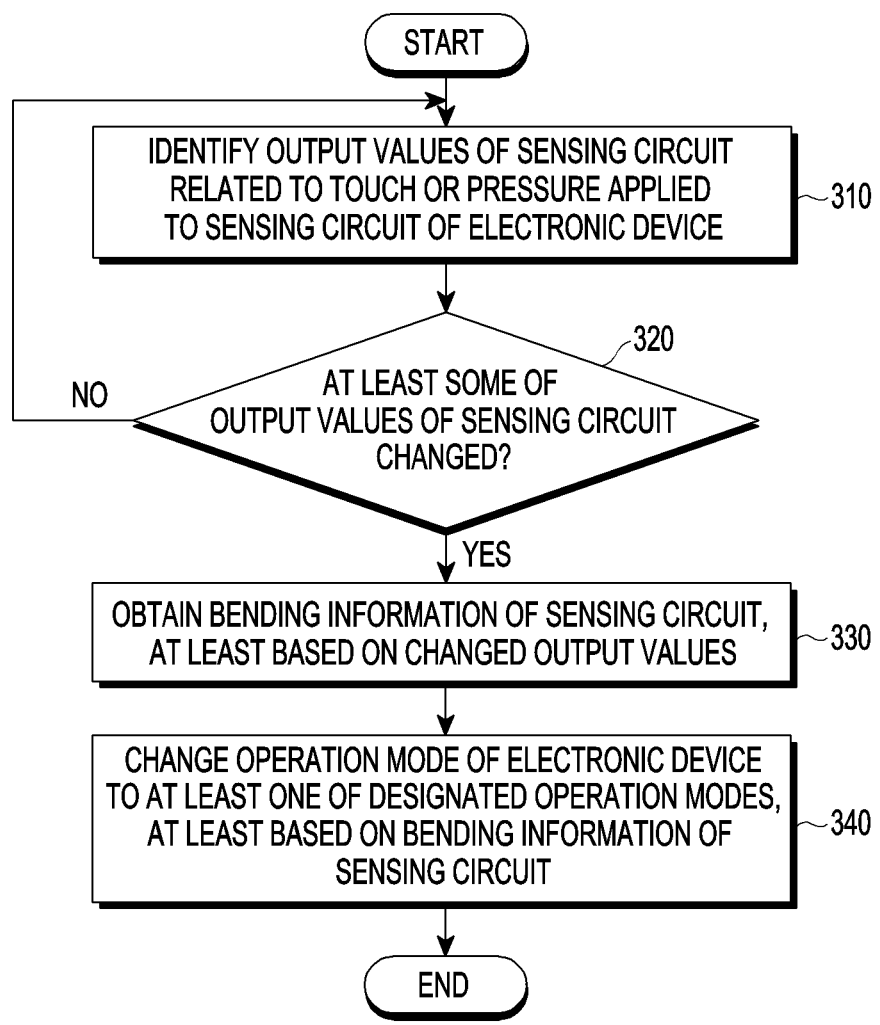
FIG. 3 is a flowchart illustrating operations of an electronic device according to various embodiments.

FIG. 3 is a flowchart illustrating operations of an electronic device according to various embodiments. The operations may include operations 310 through 340. Each of the operations may be performed by at least one of an electronic device (e.g., the electronic device 101), at least one processor (e.g., the processor 120) of the electronic device, or a controller (e.g., a combination of the processor 120 and a power management module (e.g., the power management module 188)) of the electronic device. In an embodiment, at least one of operations 310 through 340 may be omitted, or other operations may be added.

In operation 310, the electronic device may identify output values of the sensing circuit related to a touch or a pressure applied to the sensing circuit (e.g., a touch circuit that may be included in the display device 160).

In operation 320, the electronic device may identify whether at least some of the output values of the sensing circuit related to the touch or the pressure applied to the sensing circuit are changed.

According to an embodiment, when the electronic device identifies a change in the at least some of the output values of the sensing circuit related to the touch or the pressure applied to the sensing circuit, the electronic device may execute operation 330; otherwise, the electronic device may perform operation 310 again.

According to an embodiment, when the electronic device senses the change in the at least some of the output values of the sensing circuit, the electronic device may determine, at least based on a designated criterion, the changed output values as information of a pressure input to the sensing circuit or information of a touch input to the sensing circuit. For example, the designated criterion may include at least one of a magnitude of the changed output values, the number of changed output values, a position of the sensing circuit from which the changed output values are output, an area of a region of the sensing circuit from which the changed output values are output, or a shape of the region of the sensing circuit from which the changed output values are output.

In operation 330, the electronic device may obtain bending information of the sensing circuit, at least based on the changed output values.

According to an embodiment, the bending information may include at least one of a bending position, a bending strength, a bending angle, a bending direction, or a bending area.

In operation 340, the electronic device may switch an operation mode thereof to at least one of designated operation modes, at least based on the bending information of the sensing circuit.

According to an embodiment, the electronic device may designate (store) an operation mode corresponding to each piece of bending information.

According to an embodiment, the operation mode may include a sleep mode, a dual display mode, a typing mode, or a wake-up mode. For example, the sleep mode may be set in which a screen of a display device (e.g., the display device 160) of the electronic device is automatically turned off. For example, the dual display mode may be set in which a first screen is displayed in a first region of the display device and a second screen is displayed in a second region of the display device. For example, the typing mode may be set in which a virtual keypad is displayed to allow a user to input a character. For example, the wake-up mode may be set in which a screen of the display device of the electronic device is automatically turned on.

According to an embodiment, the operation mode may include a first antenna operation mode in which a first antenna operates or a second antenna operation mode in which a second antenna operates.

According to an embodiment, the operation mode may include a first circuit connection mode in which one or more antennas are connected with a first contact point of the circuit or a second circuit connection mode in which the one or more antennas are connected with a second contact point.

According to various embodiments, a method for changing an operation mode based on bending information using a sensing circuit of an electronic device (e.g., the electronic device 101) may include identifying output values of the sensing circuit (e.g., the display device 160) related to a touch or a pressure applied to the sensing circuit of the electronic device, obtaining, when at least some of output values are changed, bending information of the sensing circuit at least based on the changed output values, and changing an operation mode of the electronic device to at least one of designated operation modes, at least based on the bending information of the sensing circuit.

According to various embodiments, the method may further include, when sensing a change in the at least some of the output values of the sensing circuit, determining, at least based on a designated criterion, the changed output values as information of a pressure input to the sensing circuit or information of a touch input to the sensing circuit.

According to various embodiments, the designated criterion may include at least one of a magnitude of the changed output values, the number of changed output values, a position of the sensing circuit from which the changed output values are output, an area of a region of the sensing circuit from which the changed output values are output, or a shape of the region of the sensing circuit from which the changed output values are output.

According to various embodiments, the method may further include, when a range of output values corresponding to a designated region of the sensing circuit is changed to a designated first range, determining that a pressure at least based on the output values of the first range is applied to the sensing circuit.

According to various embodiments, the bending information of the sensing circuit may include at least one of a bending position, a bending strength, a bending angle, a bending direction, or a bending area.

According to various embodiments, the obtaining of the bending information of the touch circuit may include determining a bending angle of the sensing circuit, based on a magnitude of the changed output values.

According to various embodiments, the changing of the operation mode of the electronic device to at least one of the designated operation modes may include changing the operation mode to a sleep mode, a dual display mode, a typing mode, or a wake-up mode.

Figure 4A:
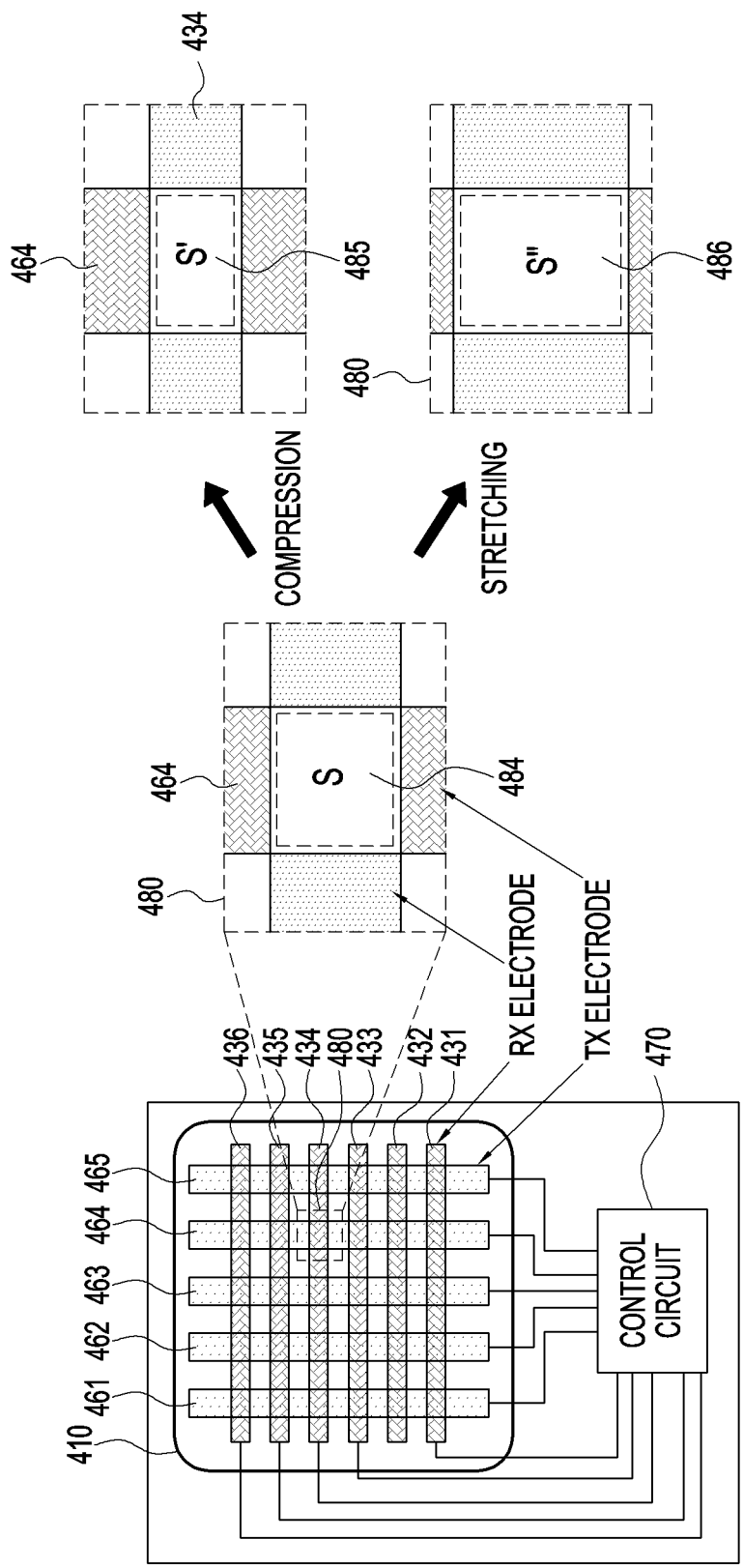
FIG. 4A is a diagram for describing a structure of a pressure sensor according to various embodiments.
Figure 4B:
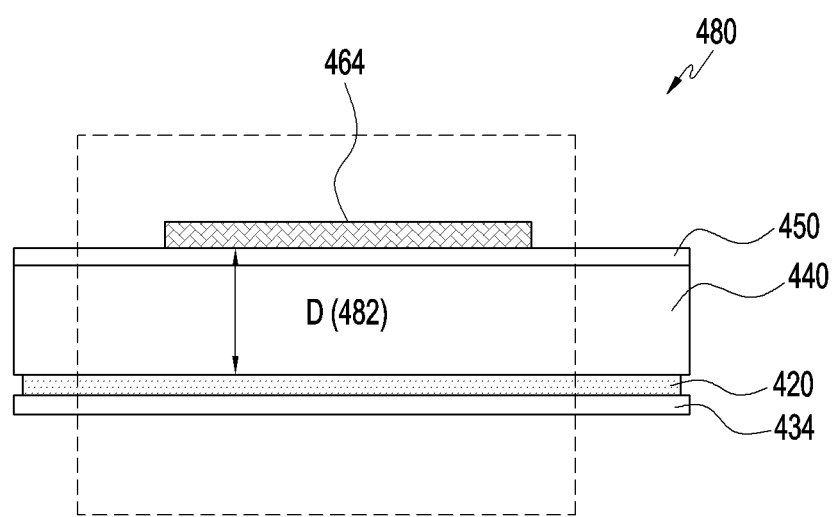
FIG. 4B is a diagram for describing a structure of a pressure sensor according to various embodiments.

FIG. 4A is a diagram for describing a structure of a pressure sensor according to various embodiments. FIG. 4B is a diagram for describing a structure of a pressure sensor according to various embodiments.

Referring to FIG. 4A, a pressure sensor 401 may include a sensing circuit 410 (e.g., a touch circuit, a touch sensor, a touchscreen, a touch layer, or a touch panel) or a control circuit 470 (e.g., a touch panel integrated circuit (IC)).

Referring to FIG. 4A, the sensing circuit 410 may include a first electrode layer and a second electrode layer. A plurality of first electrodes 431 through 436 may be disposed on the first electrode layer, and a plurality of second electrodes 461 through 465 may be disposed on the second electrode layer. For example, the plurality of first electrodes 431 through 436 and the plurality of second electrodes 461 through 465 may be disposed to intersect (or meet orthogonally) one another with spaces therebetween.

According to an embodiment, the control circuit 470 may provide an electric signal (e.g., a signal based on a capacitance sensing scheme) to at least one of the plurality of first electrodes 431 through 436, and provide an electric signal (e.g., a signal based on a capacitance sensing scheme) to at least one of the plurality of second electrodes 461 through 465.

According to an embodiment, a cross-sectional view of a first point 480 of FIG. 4A may be as illustrated in FIG. 4B. Referring to FIG. 4B, the sensing circuit 410 may include a first electrode 434, a first film 420, an adhesive 440, a second film 450, or a second electrode 464. For example, the adhesive 440 may include an optically clear adhesive (OCA). For example, the first film 420 may be disposed on a top end of the first electrode 434. The adhesive 440 may be disposed on a top end of the first film 420. The second film 450 may be disposed on a top end of the adhesive 440. The second electrode 464 may be formed on a top end of the second film 450.

According to an embodiment, when the control circuit 470 applies an electric signal (e.g., a voltage) to at least one of the plurality of first electrodes 431 through 436 and the plurality of second electrodes 461 through 465, a capacitance may be formed between at least one of the plurality of first electrodes 431 through 436 and at least one of the plurality of second electrodes 461 through 465.

According to an embodiment, when the sensing circuit 410 is bent by an external pressure, at least some of the plurality of first electrodes 431 through 436 or the plurality of second electrodes 461 through 465 may be compressed or stretched such that an area of an overlapping portion between the at least some first electrodes and the at least some second electrodes may be changed. A capacitance between the at least some first electrodes and the at least some second electrodes may be changed based on the change in the area.

For example, the electronic device may calculate a capacitance in the first point 480 of FIG. 4A by using Equation 1.

$$C = \frac{\varepsilon S}{D} \quad \text{[Equation 1]}$$

(C: capacitance, D: a space 482 between a first electrode 434 and a second electrode 464, S: an area 484 of an overlapping portion between the first electrode 434 and the second electrode 464, ε: permittivity)

For example, referring to FIG. 4A, when at least a partial region of the sensing circuit 410 including the first point 480 is bent and thus the first point 480 is compressed, an area of the first point 480 may be changed. For example, the area of the overlapping portion between the first electrode 434 and the second electrode 464 may be reduced from S 484 to S' 485. As the area of the overlapping portion between the first electrode 434 and the second electrode 464 is reduced, the capacitance in the first point 480 may be reduced. For example, based on an electric signal applied by the control circuit 470, a capacitance may be formed between the first electrode 434 and the second electrode 464 in the first point 480. For example, the electronic device may identify a change in the capacitance between the first electrode 434 and the second electrode 464 in the first point 480, based on Equation 1. When the first point 480 of FIG. 4A is compressed, a change (reduction) level of the capacitance of the first point 480 may be calculated.

For example, referring to FIG. 4A, when at least a partial region of the sensing circuit 410 including the first point 480 is bent and thus the first point 480 is stretched, the area of the first point 480 may be changed. For example, the area of the overlapping portion between the first electrode 434 and the second electrode 464 may be enlarged from S 484 to S" 486. As the area of the overlapping portion between the first electrode 434 and the second electrode 464 is enlarged, the capacitance in the first point 480 may be increased. For example, based on an electric signal applied by the control circuit 470, a capacitance may be formed between the first electrode 434 and the second electrode 464 in the first point 480. For example, the electronic device may identify a change in the capacitance between the first electrode 434 and the second electrode 464 in the first point 480, based on Equation 1. When the first point 480 of FIG. 4A is stretched, an increase level of the capacitance of the first point 480 may be calculated.

According to an embodiment, an electronic device (e.g., the electronic device 101 or the processor 120 of the electronic device) including the pressure sensor 401 may obtain bending information of the sensing circuit 410 based on a variance of a capacitance between at least some of the plurality of first electrodes 431 through 436 and at least some of the plurality of second electrodes 461 through 465. For example, the electronic device may store bending information corresponding to a designated capacitance and/or a change level of the designated capacitance, respectively. For example, the bending information may include at least one of a bending position, a bending strength, a bending angle, a bending direction, or a bending area.

For example, when the bending angle corresponding to each change level of the designated capacitance is designated in the electronic device, the electronic device may determine a bending angle of the first point 480 corresponding to compression, based on the change level of the capacitance of the first point 480. For example, when the bending angle corresponding to each change (increase) level of the designated capacitance is designated in the electronic device, the electronic device may determine a bending angle of the first point 480 corresponding to stretching, based on the increase level of the capacitance of the first point 480.

In the embodiment described with reference to FIGS. 4A and 4B, the plurality of first electrodes 431 through 436 of the first electrode layer 430 and the plurality of second electrodes 461 through 465 of the second electrode layer 460 are described as being disposed to intersect one another, but according to another embodiment, they may also be disposed in various forms such as a diamond pattern, a mesh form, etc. For example, when electrode layers disposed in a sensing circuit form a diamond pattern, a ground (GND) electrode layer may be further disposed under the electrode layers.

Referring to the embodiment described with reference to FIGS. 4A and 4B, the sensing circuit 410 of the pressure sensor 401 may have the same touch panel structure as a display device (e.g., the display device 160) (e.g., a touchscreen of a capacitance (mutual capacitance or magnetic capacitance) type), and the control circuit 470 of the pressure sensor 401 may be a control circuit of the same type as a control circuit of the display device. For example, when the electronic device includes the display device, the display device may be integrated with the pressure sensor 401 of the embodiment described with reference to FIGS. 4A and 4B. For example, the display device may execute a function of the pressure sensor 401 described above, such that a moving space of the pressure sensor in a Z-axis direction is not necessarily assigned for the pressure sensor, avoiding the increase of the thickness of the electronic device, caused by attachment of a separate pressure sensor.

Figure 5A:
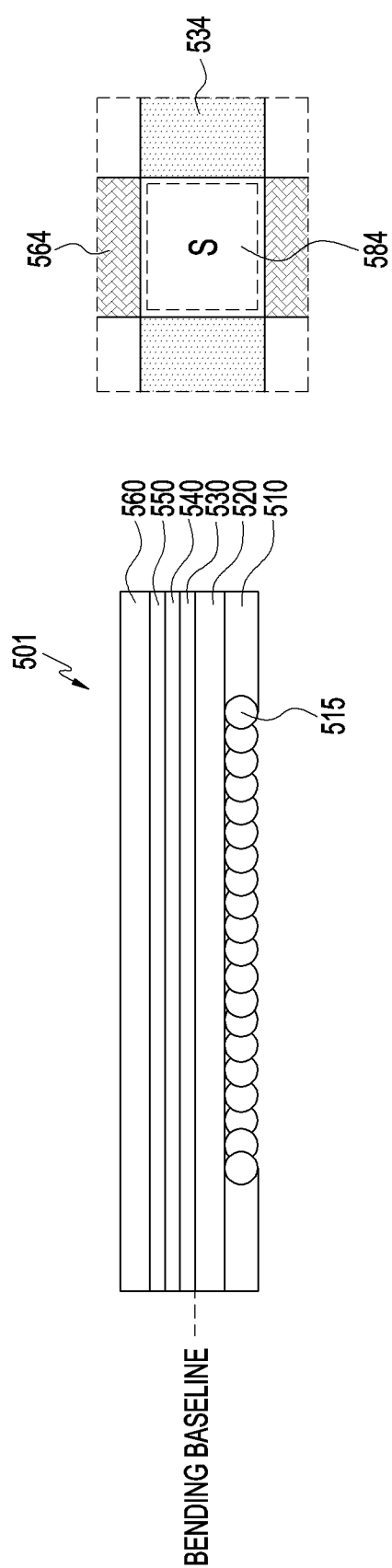
FIG. 5A is a diagram for describing an operation of sensing a pressure applied to an electronic device using a touchscreen of an electronic device, according to various embodiments.
Figure 5B:
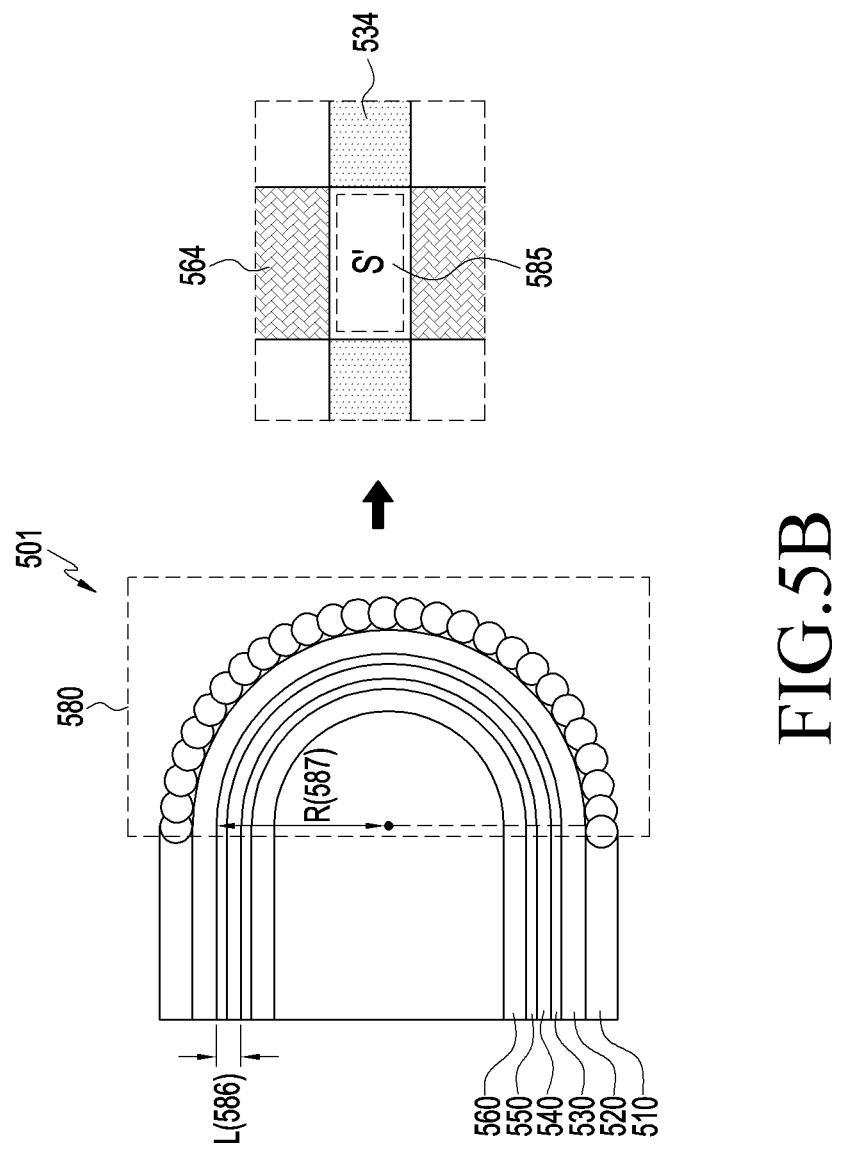
FIG. 5B is a diagram for describing an operation of sensing a pressure applied to an electronic device using a touchscreen of an electronic device, according to various embodiments.

FIG. 5A is a diagram for describing an operation of sensing a pressure applied to an electronic device (e.g., the electronic device 101 or the processor 120 of the electronic device) by using a display device 501 (e.g., the display device 160) of the electronic device, according to various embodiments. FIG. 5B is a diagram for describing an operation of sensing a pressure applied to an electronic device (e.g., the electronic device 101 or the processor 120 of the electronic device) by using a display device 501 (e.g., the display device 160) of the electronic device, according to various embodiments.

According to an embodiment, the electronic device may be a flexible electronic device that is transformable to have a designated curvature by being bent. For example, the electronic device may be bent by a force applied from outside. For example, at least a portion of a housing of the electronic device may be manufactured with a flexible material that is bendable by a force applied from outside.

Referring to FIGS. 5A and 5B, the display device 501 of the electronic device may include a machinery portion 510, a display panel 520, a first adhesive 530, a sensing circuit 540 (also referred to as a touch panel), a second adhesive 550, and a cover window 560. The machinery portion 510 may include a hinge 515 for bending of the display device 501. For example, the display panel 520 may be disposed on a top end of the machinery portion 510. The first adhesive 530 may be disposed on a top end of the display panel 520, and the sensing circuit 540 may be disposed on a top end of the first adhesive 530. The second adhesive 550 may be disposed on a top end of the sensing circuit 540, and the cover window 560 may be disposed on a top end of the second adhesive 550. For example, a bending baseline corresponding to the bending of the display device 501 may be between the display panel 520 and the first adhesive 530.

According to an embodiment, when the display device 501 is bent by an external pressure, the sensing circuit 540 may be compressed.

According to an embodiment, the display device 501 opened at 180 degrees as shown in FIG. 5A may be bent by a force applied from outside and thus be transformed to have a designated curvature of 0 degree as shown in FIG. 5B. For example, when the display device 501 is transformed from a form shown in FIG. 5A into a form shown in FIG. 5B, at least some of first electrodes and second electrodes included in a bending region 580 of the sensing circuit 540 among a plurality of first electrodes (e.g., the plurality of first electrodes 431 through 436) and a plurality of second electrodes (e.g., the plurality of second electrodes 461 through 465) of the sensing circuit 540 may be compressed. For example, overlapping areas between the first electrodes and the second electrodes included in the bending region 580 may be changed based on the compression, such that capacitances between the first electrodes and the second electrodes included in the bending region 580 may be changed.

For example, the electronic device may calculate a first capacitance between a first electrode 534 and a second electrode 564 of the display device 501 opened at 180 degrees as shown in FIG. 5A, by using Equation 2.

$$C = \frac{\varepsilon S}{D} \qquad \text{[Equation 2]}$$

(C: a first capacitance, D: a space between the first electrode 534 and the second electrode 564, S: a first area 584 of an overlapping portion between the first electrode 534 and the second electrode 564, ε: permittivity)

For example, the electronic device may calculate a second capacitance between the first electrode 534 and the second electrode 564 of the display device 501 having a designated curvature of 0 degree as shown in FIG. 5B, by using Equation 3.

$$S = \frac{\varepsilon S'}{D} \qquad \text{[Equation 3]}$$

(C: a second capacitance, D: a space between the first electrode 534 and the second electrode 564, S: a second area 585 of an overlapping portion between the first electrode 534 and the second electrode 564, ε: permittivity)

For example, when the display device 501 opened at 180 degrees as shown in FIG. 5A is transformed to have a designated curvature of 0 degree as shown in FIG. 5B, the electronic device may calculate a capacitance variance by using Equation 4, based on results of Equation 2 and Equation 3.

$$\frac{\Delta C}{C} = \frac{|C - C'|}{C} = \frac{|S - S'|}{S} = \frac{L}{R} \qquad \text{[Equation 4]}$$

(ΔC/C: a capacitance variance, C: a first capacitance, C': a second capacitance, S: the first area 584, S': the second area 585, R: a radius of curvature 587, L: a distance including the first adhesive 530 and the sensing circuit 540)

For example, the electronic device may calculate a capacitance between at least one first electrode and at least one second electrode among the plurality of first electrodes and the plurality of second electrodes of the sensing circuit 540, and/or a variance of the capacitance, based on Equation 2, Equation 3, and/or Equation 4.

According to an embodiment, the electronic device may obtain bending information of the display device 501 based on capacitances between first electrodes and second electrodes included in the bending region 580 and/or a variance of the capacitance. For example, the bending information may include at least one of a bending position, a bending strength, a bending angle, a bending direction, or a bending area. For example, the electronic device may identify a bending position, a bending direction, and/or a bending area of the display device 501, based on a changed position and/or distribution, etc., of the capacitance between the first electrodes and the second electrodes. For example, the electronic device may identify a bending strength and/or a bending angle of the display device 501, based on the capacitance between the first electrodes and the second electrodes and/or a variance of the capacitance. For example, the electronic device may store bending information corresponding to designated capacitances and/or capacitance variances, respectively.

Figure 6A:
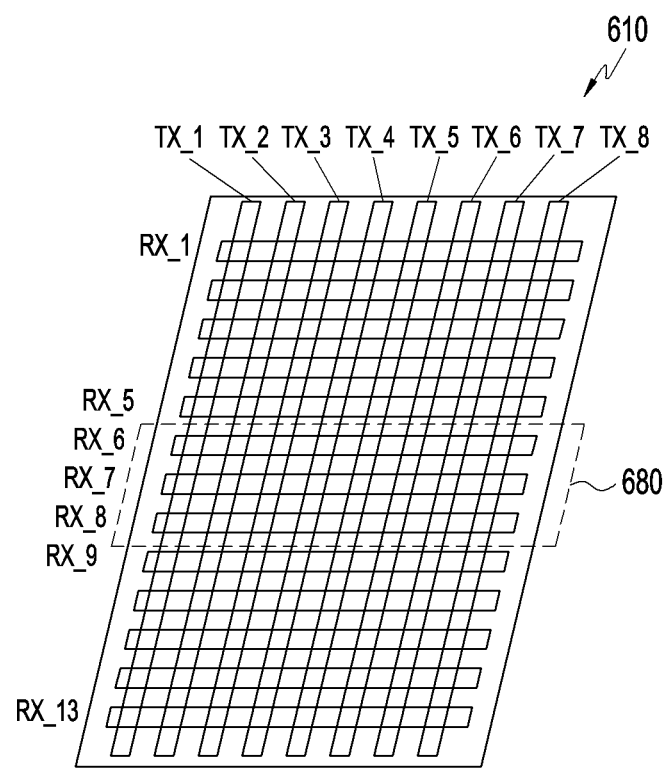
FIG. 6A is a diagram for describing a capacitance variance with respect to bending of an electronic device, according to various embodiments.
Figure 6B:
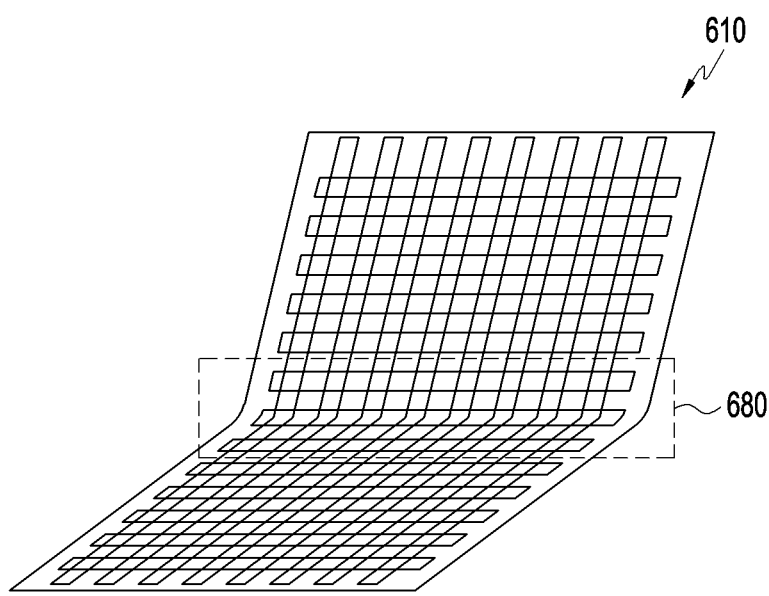
FIG. 6B is a diagram for describing a capacitance variance with respect to bending of an electronic device, according to various embodiments.
Figure 6C:
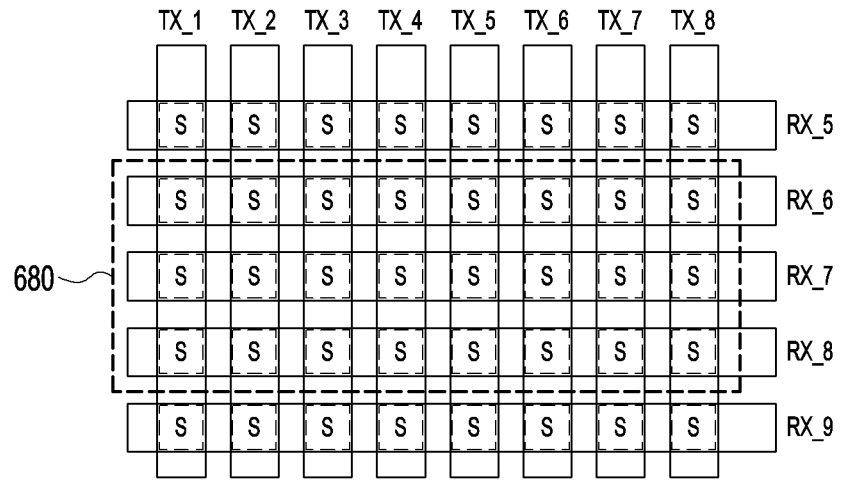
FIG. 6C is a diagram for describing a capacitance variance with respect to bending of an electronic device, according to various embodiments.
Figure 6D:
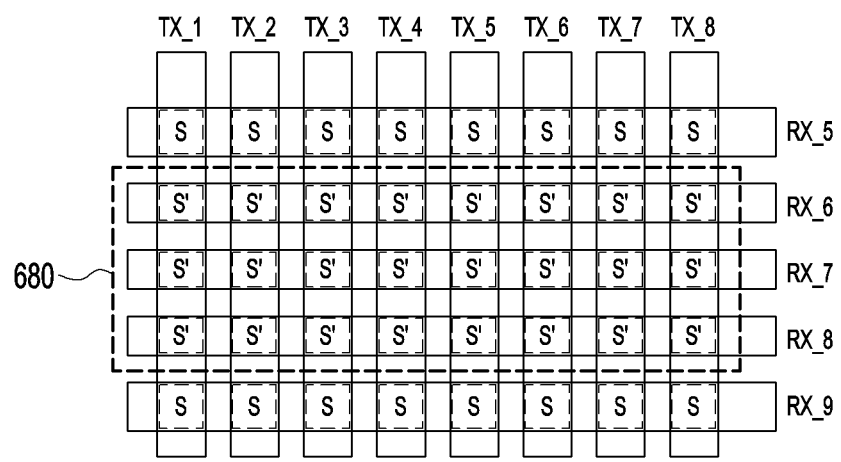
FIG. 6D is a diagram for describing a capacitance variance with respect to bending of an electronic device, according to various embodiments.

FIG. 6A is a diagram for describing a capacitance variance with respect to bending of an electronic device (e.g., the electronic device 101), according to various embodiments. FIG. 6B is a diagram for describing a capacitance variance with respect to bending of an electronic device (e.g., the electronic device 101), according to various embodiments. FIG. 6C is a diagram for describing a capacitance variance with respect to bending of an electronic device (e.g., the electronic device 101), according to various embodiments. FIG. 6D is a diagram for describing a capacitance variance with respect to bending of an electronic device (e.g., the electronic device 101), according to various embodiments.

Referring to FIGS. 6A and 6B, a sensing circuit 610 of the electronic device may include a first electrode layer and a second electrode layer. A plurality of first electrodes (e.g., RX_1 through RX_13) may be disposed on the first electrode layer, and a plurality of second electrodes (e.g., TX_1 through TX_8) may be disposed on the second electrode layer. For example, the plurality of first electrodes (e.g., RX_1 through RX_13) and the plurality of second electrodes (e.g., TX_1 through TX_8) may be disposed to intersect (or meet orthogonally) one another with spaces therebetween.

According to an embodiment, the electronic device may apply an electric signal (e.g., a voltage) to the first electrode layer and the second electrode layer, and a capacitance between the first electrode layer and the second electrode layer may be formed based on the electric signal. For example, the electronic device may apply an electric signal (e.g., a voltage) sequentially to TX_1 through TX_8 of the second electrode layer, and simultaneously to RX_1 through RX_13 of the first electrode layer.

According to an embodiment, when a first region 680 including RX_6 through RX_8 is bent in a sensing circuit 610 of FIG. 6A such that the sensing circuit 610 is bent as shown in FIG. 6B, an area of each of overlapping portions between the plurality of first electrodes RX_6 through RX_8 and the plurality of second electrodes TX_1 through TX_8 included in the first region 680 may be changed from a form as shown in FIG. 6C into a form as shown in FIG. 6D. Referring to FIGS. 6C and 6D, the area of each of the overlapping portions between the plurality of first electrodes RX_6 through RX_8 and the plurality of second electrodes TX_1 through TX_8 included in the first region 680 may be reduced from S to S'.

According to an embodiment, when the first region 680 is bent in the sensing circuit 610 of FIG. 6A such that the sensing circuit 610 is bent as shown in FIG. 6B, an area of each of overlapping portions between the plurality of first electrodes RX_5 and RX_9 and the plurality of second electrodes TX_1 through TX_8 included in an unbending region of the sensing circuit 610 may not be changed from the form as shown in FIG. 6C into the form as shown in FIG. 6D.

According to an embodiment, as the area of each of the overlapping portions between the plurality of first electrodes RX_6 through RX_8 and the plurality of second electrodes TX_1 through TX_8 included in the first region 680 is changed, capacitances between the plurality of first electrodes RX_6 through RX_8 and the plurality of second electrodes TX_1 through TX_8 may be changed. For example, as the area of each of the overlapping portions between the plurality of first electrodes RX_5 and RX_9 and the plurality of second electrodes TX_1 through TX_8 included in the unbending region is not changed, a capacitance between first electrodes and second electrodes may not be changed. Referring to Table 1, capacitances between the plurality of first electrodes RX_6 through RX_8 and the plurality of second electrodes TX_1 through TX_8 included in the first region 680 may be less than capacitances between the plurality of first electrodes RX_5 and RX_9 and the plurality of second electrodes TX_1 through TX_8 in the unbending region.

TABLE 1

|  | TX_1 | TX_2 | TX_3 | TX_4 | TX_5 | TX_6 | TX_7 | TX_8 | Average |
|---|---|---|---|---|---|---|---|---|---|
| RX_5 | 500 | 505 | 502 | 500 | 495 | 490 | 495 | 500 | 498 |
| RX_6 | 450 | 460 | 455 | 440 | 455 | 450 | 448 | 450 | 451 |
| RX_7 | 440 | 455 | 450 | 448 | 450 | 455 | 440 | 455 | 449 |
| RX_8 | 450 | 448 | 440 | 455 | 450 | 448 | 450 | 450 | 448 |
| RX_9 | 498 | 495 | 500 | 505 | 490 | 510 | 505 | 500 | 500 |

Figure 7A:
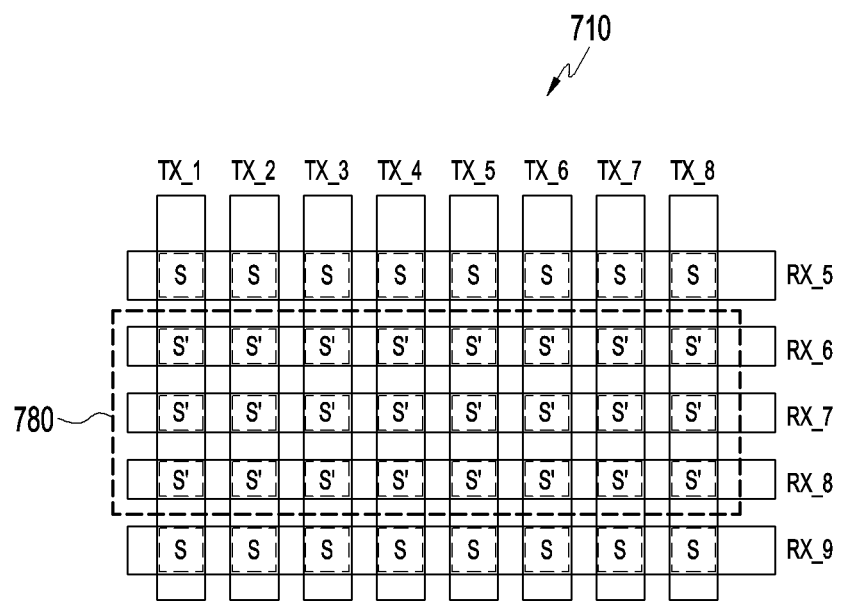
FIG. 7A is a diagram for describing a capacitance variance with respect to a bending angle of an electronic device, according to various embodiments.
Figure 7B:
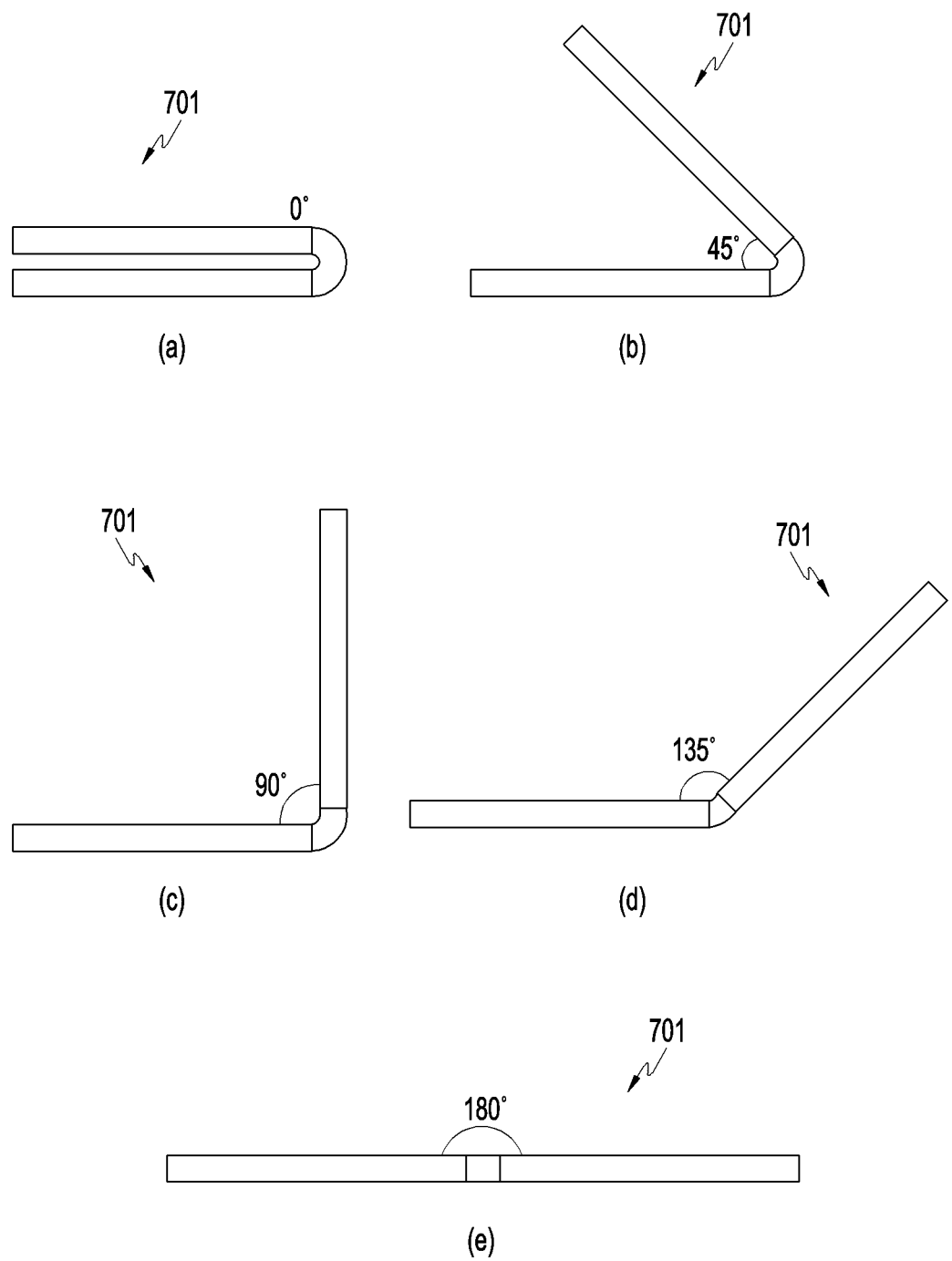
FIG. 7B is a diagram for describing a capacitance variance with respect to a bending angle of an electronic device, according to various embodiments.

FIG. 7A is a diagram for describing a capacitance variance with respect to a bending angle of an electronic device (e.g., the electronic device 101), according to various embodiments. FIG. 7B is a diagram for describing a capacitance variance with respect to a bending angle of an electronic device (e.g., the electronic device 101), according to various embodiments.

Referring to FIG. 7A, a sensing circuit 710 of the electronic device may include a first electrode layer (e.g., an Rx electrode layer) and a second electrode layer (e.g., a Tx electrode layer). A plurality of first electrodes RX_5 through RX_9 may be disposed on the first electrode layer, and a plurality of second electrodes TX_1 through TX_8 may be disposed on the second electrode layer. For example, the plurality of first electrodes RX_5 through RX_9 and the plurality of second electrodes TX_1 through TX_8 may be disposed to meet orthogonally one another.

According to an embodiment, a capacitance between the plurality of first electrodes RX_6 through RX_8 and the plurality of second electrodes TX_1 through TX_8 included in a bending region, a first region 780, among the plurality of first electrodes RX_5 through RX_9 and the plurality of second electrodes TX_1 through TX8 of the sensing circuit 710 may be changed with a bending angle (e.g., a bending level) of the electronic device 701. For example, the electronic device 701 may determine a bending angle of the electronic device 701 based on a capacitance variance. For example, as the bending angle of the electronic device 701 approaches 0 degree, a compression amount of at least some electrodes included in a bending region among a plurality of first electrodes and a plurality of second electrodes may increase, reducing a capacitance. For example, when the first region 780 of the sensing circuit 710 of the electronic device 701 is bent, an area of each of overlapping portions between the plurality of first electrodes RX_6 through RX_8 and the plurality of second electrodes TX_1 through TX_8 included in the first region 780 may be reduced from S to S' when compared to an area of each of overlapping portions between the plurality of first electrodes RX_5 through RX_9 and the plurality of second electrodes TX_1 through TX_8 in unbending regions.

Referring to FIG. 7B, the electronic device 701 may be changed to forms of various angles such as a form having a designated curvature of 0 degree, a form having an angle of 45 degrees, a form having an angle of 90 degrees, a form having an angle of 135 degrees, a form having an angle of 180 degrees, etc.

For example, as shown in FIG. 7B(a), when the electronic device 701 is bent and thus is changed to a form having a designated curvature of 0 degree, a range of a corresponding capacitance may be from 440 to 455 and an average of the capacitance may be 449 as shown in Table 2 provided below.

For example, as shown in FIG. 7B(b), when the electronic device 701 is bent and thus is changed to a form having an angle of 45 degrees, a range of a corresponding capacitance may be from 450 to 470 and an average of the capacitance may be 461 as shown in Table 2 provided below.

For example, as shown in FIG. 7B(c), when the electronic device 701 is bent and thus is changed to a form having an angle of 90 degrees, a range of a corresponding capacitance may be from 465 to 480 and an average of the capacitance may be 474 as shown in Table 2 provided below.

For example, as shown in FIG. 7B(d), when the electronic device 701 is bent and thus is changed to a form having an angle of 135 degrees, a range of a corresponding capacitance may be from 480 to 490 and an average of the capacitance may be 488 as shown in Table 2 provided below.

For example, as shown in FIG. 7B(e), when the electronic device 701 is bent and thus is changed to a form having an angle of 180 degrees, a range of a corresponding capacitance may be from 490 to 505 and an average of the capacitance may be 500 as shown in Table 2 provided below.

Figure 8A:
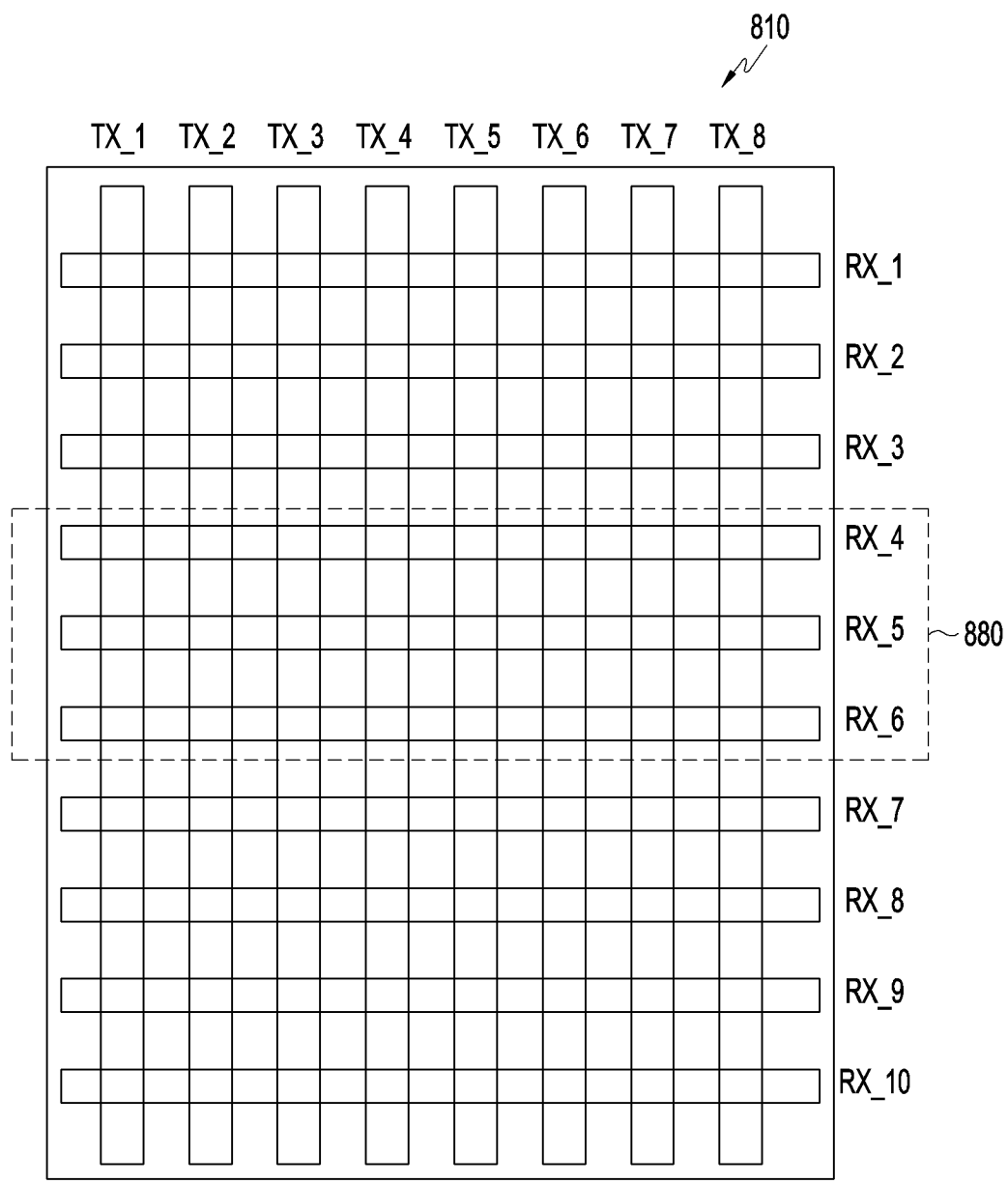
FIG. 8A illustrates embodiments of a sensing circuit of an electronic device, according to various embodiments.
Figure 8B:
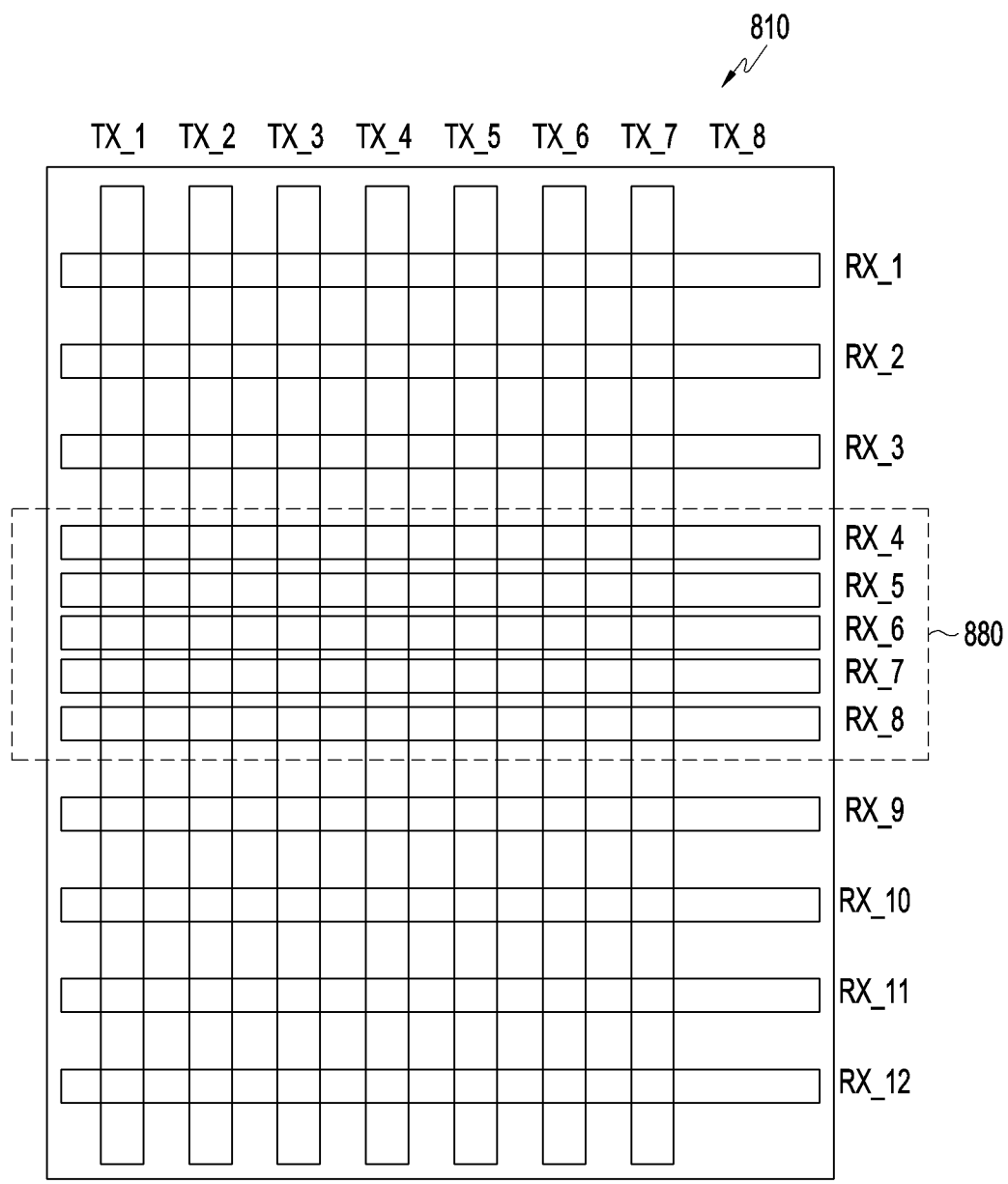
FIG. 8B illustrates embodiments of a sensing circuit of an electronic device, according to various embodiments.

Referring to FIGS. 8A and 8B, a sensing circuit 810 of the electronic device may include a first electrode layer (e.g., an Rx electrode layer) and a second electrode layer (e.g., a Tx electrode layer). A plurality of first electrodes RX_1 through RX_10 may be disposed on the first electrode layer, and a plurality of second electrodes TX_1 through TX_8 may be disposed on the second electrode layer. For example, the plurality of first electrodes RX_1 through RX_10 and the plurality of second electrodes TX_1 through TX_8 may be disposed to orthogonally meet one another.

According to an embodiment, a bending region 880 of the sensing circuit 810 of the electronic device may be designated.

For example, as shown in FIG. 8A, when a region where RX_4 through RX_6 are disposed among the plurality of first electrodes RX_1 through RX_10 of the first electrode layer in the sensing circuit 810 of the electronic device is designated as the bending region 880, the electronic device may sense a capacitance variance of the bending region 880, thus improving a processing speed of the electronic device.

For example, as shown in FIG. 8B, by disposing RX_4 through RX_8 among the plurality of first electrodes RX_1 through RX_10 of the first electrode layer in the sensing circuit 810 of the electronic device with a designated narrower space than other first electrodes RX_1 through RX_3 and RX_9 through RX_12, a region where RX_4 through RX_8 are disposed may be designated as the bending region 880. For example, when RX_4 through RX_8 are disposed

TABLE 2

| Electrode | RX_7 (or RX_6 or RX_8) | | | | | | | | |
| --- | --- | --- | --- | --- | --- | --- | --- | --- | --- |
| | TX_1 | TX_2 | TX_3 | TX_4 | TX_5 | TX_6 | TX_7 | TX_8 | Average |
| 0 degree | 440 | 455 | 450 | 488 | 450 | 455 | 440 | 455 | 449 |
| 45 degrees | 460 | 470 | 465 | 450 | 465 | 460 | 458 | 460 | 461 |
| 90 degrees | 465 | 480 | 475 | 473 | 475 | 470 | 465 | 480 | 474 |
| 135 degrees | 490 | 488 | 480 | 495 | 490 | 488 | 490 | 490 | 488 |
| 180 degrees | 498 | 495 | 500 | 505 | 490 | 510 | 505 | 500 | 500 |

For example, a capacitance in Table 2 may be various measurement values such as a voltage, a current, etc.

Referring to the above-described embodiment of FIGS. 5A through 7B, an example has been described where the electronic device is bent in an in-folded form such that a touch panel is compressed. However, according to another embodiment, the electronic device may be bent in an out-folded form such that a sensing circuit may be stretched. For example, when the electronic device is bent in the out-folded form, an area of an overlapping portion between first electrodes and second electrodes included in a bending region may increase, increasing a capacitance between the first electrodes and the second electrodes. The electronic device may obtain bending information of the sensing circuit based on a change in the capacitance between the first electrodes and the second electrodes included in the bending region. For example, the bending information may include at least one of a bending position, a bending strength, a bending angle, a bending direction, or a bending area. For example, the electronic device may store a capacitance and/or a change of the capacitance, corresponding to designated bending information.

FIG. 8A illustrates embodiments of a sensing circuit of an electronic device (e.g., the electronic device 101), according to various embodiments. FIG. 8B illustrates embodiments of a sensing circuit of an electronic device (e.g., the electronic device 101), according to various embodiments.

with a narrow space, an electrode density may be increased, thus improving the accuracy of measurement of bending of the bending region 880.

Figure 9A:
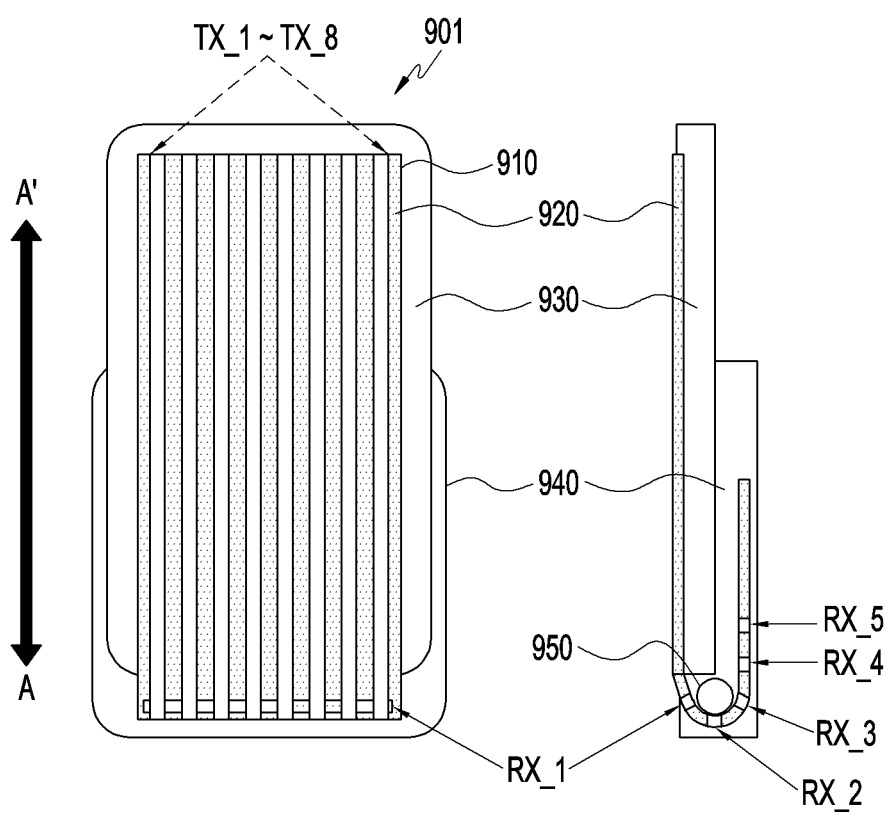
FIG. 9A is a diagram for describing an operation of changing a bending region of an electronic device, according to various embodiments.
Figure 9B:
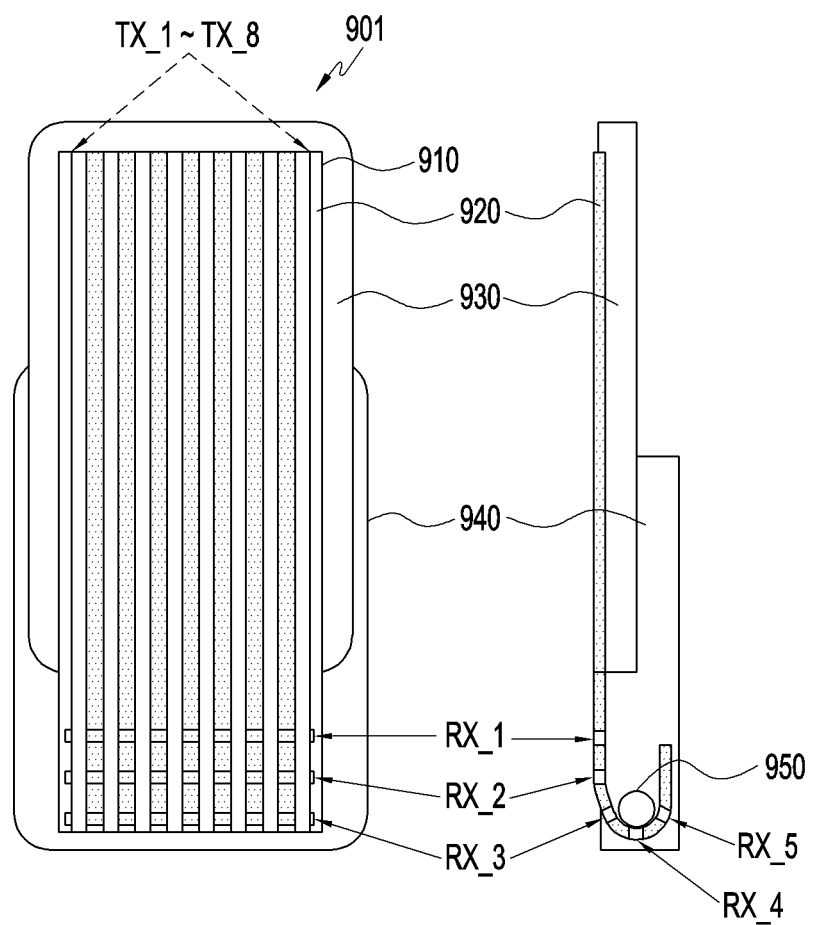
FIG. 9B is a diagram for describing an operation of changing a bending region of an electronic device, according to various embodiments.

FIG. 9A is a diagram for describing an operation of changing a bending region of an electronic device, according to various embodiments. FIG. 9B is a diagram for describing an operation of changing a bending region of an electronic device, according to various embodiments. For example, FIG. 9A is a front view and a side view of an electronic device 901 in a first form, and FIG. 9B is a front view and a side view of the electronic device 901 in a second form.

Referring to FIGS. 9A and 9B, the electronic device 901 may be a rollable electronic device. For example, the electronic device 901 may differently measure a capacitance of a bent (rolled) and a capacitance of an unbent (unrolled) region, such that the electronic device 901 may identify the bent (rolled) region based on the capacitances and/or a variance of the capacitances.

For example, in the electronic device 901, a rollable display 920 may be disposed on a front surface of a tool upper portion 930 and a front surface of a tool lower portion 940 facing the tool upper portion 930. For example, a hinge 950 may be disposed in a bent (rolled) portion of the rollable display 920. For example, the tool upper portion 930 of the electronic device 901 may move from A to A' by an external force in a position of FIG. 9A, such that a form of the electronic device may be changed to a form as shown in FIG.

9B. For example, the tool upper portion 930 of the electronic device 901 may move from A' to A by an external force in a position of FIG. 9B, such that the form of the electronic device may be changed to the form as shown in FIG. 9A.

Along with movement of the tool upper portion 930, at least a part of the rollable display 920 may be bent (rolled). For example, the rollable display 920 may include a sensing circuit 910 including a first electrode layer (an RX electrode layer) and a second electrode layer (a TX electrode layer). For example, in the sensing circuit 910, rolled regions may have a capacitance that is greater than unrolled regions.

As shown in FIG. 9A, when in the sensing circuit 910, a bent (rolled) region includes RX_1 through RX_3, a capacitance of an overlapping portion between RX_1 through RX_3 and TX_1 through TX_8 may be greater than a capacitance of an overlapping portion between RX_4 and RX_5 and TX_1 through TX_8 included in other unbent (unrolled) regions as shown in Table 3.

TABLE 3

| | TX_1 | TX_2 | TX_3 | TX_4 | TX_5 | TX_6 | TX_7 | TX_8 | Average |
|---|---|---|---|---|---|---|---|---|---|
| RX_1 | 550 | 560 | 555 | 540 | 555 | 550 | 548 | 550 | 551 |
| RX_2 | 540 | 555 | 550 | 548 | 550 | 555 | 540 | 555 | 549 |
| RX_3 | 550 | 548 | 540 | 555 | 550 | 548 | 550 | 550 | 548 |
| RX_4 | 500 | 505 | 502 | 500 | 495 | 490 | 495 | 500 | 498 |
| RX_5 | 498 | 495 | 500 | 505 | 490 | 510 | 505 | 500 | 500 |

As shown in FIG. 9B, when in the sensing circuit 910, a bent (rolled) region includes RX_3 through RX_5, a capacitance of an overlapping portion between RX_3 through RX_5 and TX_1 through TX_8 may be greater than a capacitance of an overlapping portion between RX_1 and RX_2 and TX_1 through TX_8 included in other unbent (unrolled) regions as shown in Table 4.

TABLE 4

| | TX_1 | TX_2 | TX_3 | TX_4 | TX_5 | TX_6 | TX_7 | TX_8 | Average |
|---|---|---|---|---|---|---|---|---|---|
| RX_1 | 500 | 505 | 502 | 500 | 495 | 490 | 495 | 500 | 498 |
| RX_2 | 498 | 495 | 500 | 505 | 490 | 510 | 505 | 500 | 500 |
| RX_3 | 550 | 560 | 555 | 540 | 555 | 550 | 548 | 550 | 551 |
| RX_4 | 540 | 555 | 550 | 548 | 550 | 555 | 540 | 555 | 549 |
| RX_9 | 550 | 548 | 540 | 555 | 550 | 548 | 550 | 550 | 548 |

According to the above-described embodiment of FIGS. 5 through 9, an example has been described where the sensing circuit has a structure of a mutual capacitance type, but according to another embodiment, the example may also be applied to a sensing circuit of a magnetic capacitance type. For example, a GND electrode layer of the sensing circuit of the magnetic capacitance type may be disposed in the same form as an RX electrode layer of the mutual capacitance type. For example, the sensing circuit may be configured such that GND electrodes of the GND electrode layer and TX electrodes of the TX electrode layer orthogonally meet one another.

While it has been described in the above-described embodiment of FIGS. 5 through 9 that the plurality of electrodes of the first electrode layer and the plurality of electrodes of the second electrode layer orthogonally meet one another, they may also be disposed in various forms such as a diamond pattern, a mesh type, etc., according to another embodiment.

Figure 10:
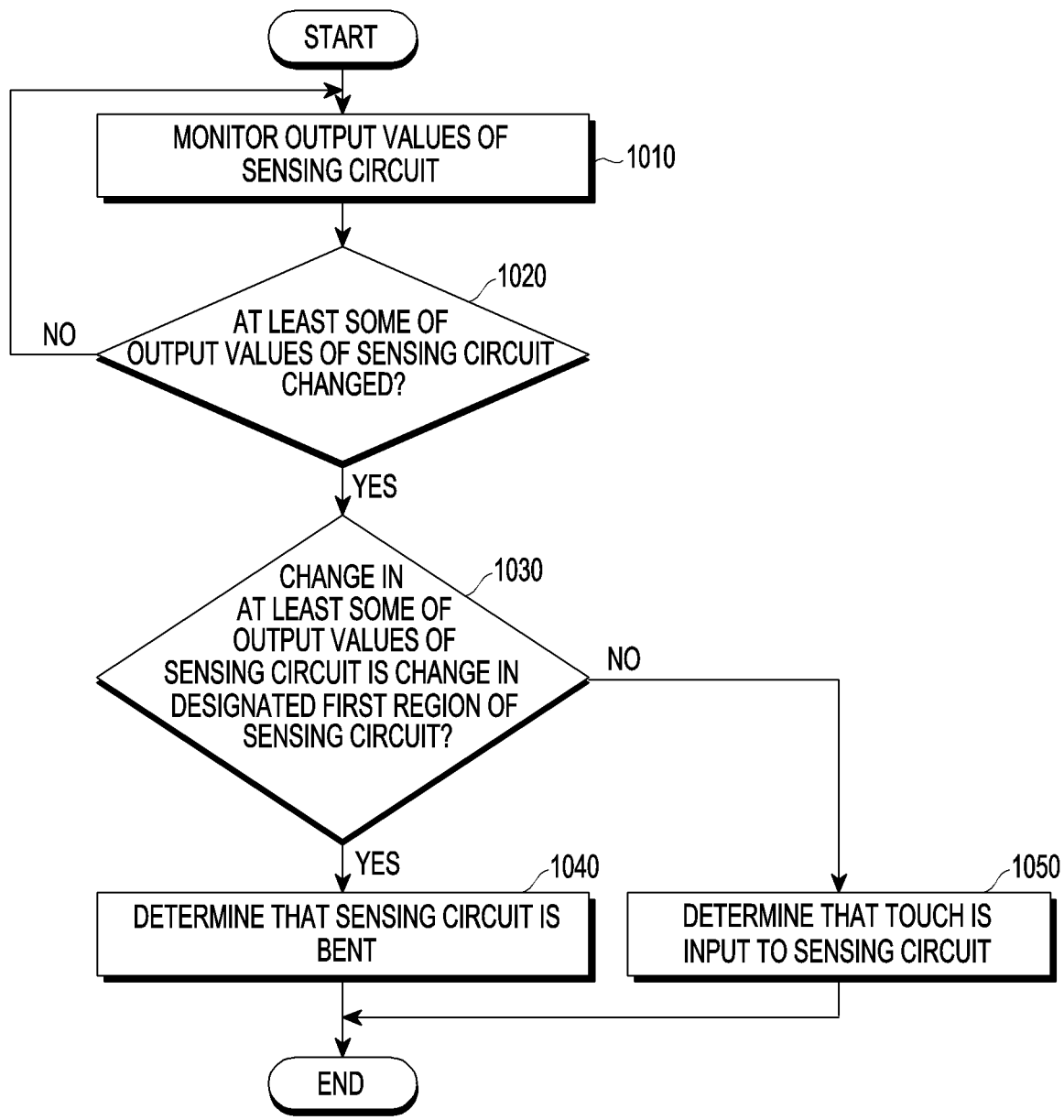
FIG. 10 is a flowchart illustrating operations of an electronic device according to various embodiments.

FIG. 10 is a flowchart illustrating operations of an electronic device according to various embodiments. The operations may include operations 1010 through 1050. Each of the operations may be performed by at least one of an electronic device (e.g., the electronic device 101), at least one processor (e.g., the processor 120) of the electronic device, or a controller (e.g., a combination of the processor 120 and a power management module (e.g., the power management module 188)) of the electronic device. In an embodiment, at least one of operations 1010 through 1050 may be omitted, an order of some of operations 510 through 590 may be changed, or other operations may be added.

Referring to FIG. 10, a bending region where the electronic device is bent may be designated, and when output values of the bending region in the sensing circuit of the electronic device are changed, it may be determined that the sensing circuit is bent.

In operation 1010, the electronic device may monitor at least some output values of the sensing circuit.

According to an embodiment, the electronic device may monitor at least some output values of the sensing circuit in real time or at designated intervals.

According to an embodiment, the output values may be capacitances that may be various forms of values such as a voltage, a current, etc.

In operation 1020, the electronic device may determine whether at least some of the output values of the sensing circuit have been changed.

According to an embodiment, the electronic device may determine whether at least some of the output values of the sensing circuit have been changed to values in a first range (e.g., out of a threshold range). For example, when at least some of the output values of the sensing circuit are changed to values in the designated first range, the electronic device may determine that at least some of the output values of the sensing circuit have been changed.

According to an embodiment, when the electronic device is bent and thus the sensing circuit is compressed, areas of overlapping portions between first electrodes and a plurality of second electrodes included in a bending region of the sensing circuit may be reduced and output values of the sensing circuit may be reduced based on reduction of the areas.

According to an embodiment, when the electronic device is bent and thus the sensing circuit is stretched, the areas of the overlapping portions between first electrodes and second electrodes included in the bending region of the sensing circuit may be enlarged and the output values of the sensing circuit may increase based on enlargement of the areas.

According to an embodiment, when the electronic device determines that the at least some of the output values of the sensing circuit are changed, the electronic device may execute operation 1030; otherwise, the electronic device may perform operation 1010 again.

In operation 1030, the electronic device may determine whether the change in the at least some of the output values of the sensing circuit is a change in the designated first region of the sensing circuit.

According to an embodiment, the region where the electronic device is bent may be designated as the first region.

According to an embodiment, when output values included in a designated minimum part included in the first region (or a designated minimum number of outputs values or more included in the first region) are changed, the electronic device may determine that the change in the at least some of the output values of the sensing circuit is the change in the designated first region of the sensing circuit.

According to an embodiment, when the change in the at least some of the output values of the sensing circuit is the change in the designated first region of the sensing circuit, the electronic device may execute operation 1040; otherwise, the electronic device may perform operation 1050.

In operation 1040, the electronic device may determine that the sensing circuit is bent.

According to an embodiment, based on the changed output values of the sensing circuit and/or variances of the output values corresponding to the change in the output values of the sensing circuit, the electronic device may identify bending information of the sensing circuit. For example, the electronic device may store bending information corresponding to designated output values and/or a variance of the designated output values, respectively. For example, the bending information may include at least one of a bending position, a bending strength, a bending angle, a bending direction, or a bending area. For example, the electronic device may identify a bending position, a bending direction, and/or a bending area of the sensing circuit, based on a changed position and/or distribution, etc., of the capacitance between the first electrodes and the second electrodes. For example, the electronic device may identify a bending strength and/or a bending angle of the sensing circuit, based on the capacitance between the first electrodes and the second electrodes and/or a variance of the capacitance.

In operation 1050, the electronic device may determine that a touch is input to the sensing circuit.

According to an embodiment, based on the changed output values of the sensing circuit and/or variances of the output values corresponding to the change in the output values of the sensing circuit, the electronic device may identify touch information of the sensing circuit. For example, the touch information may include at least one of a touch position, a touch area, or a touch duration.

Figure 11:
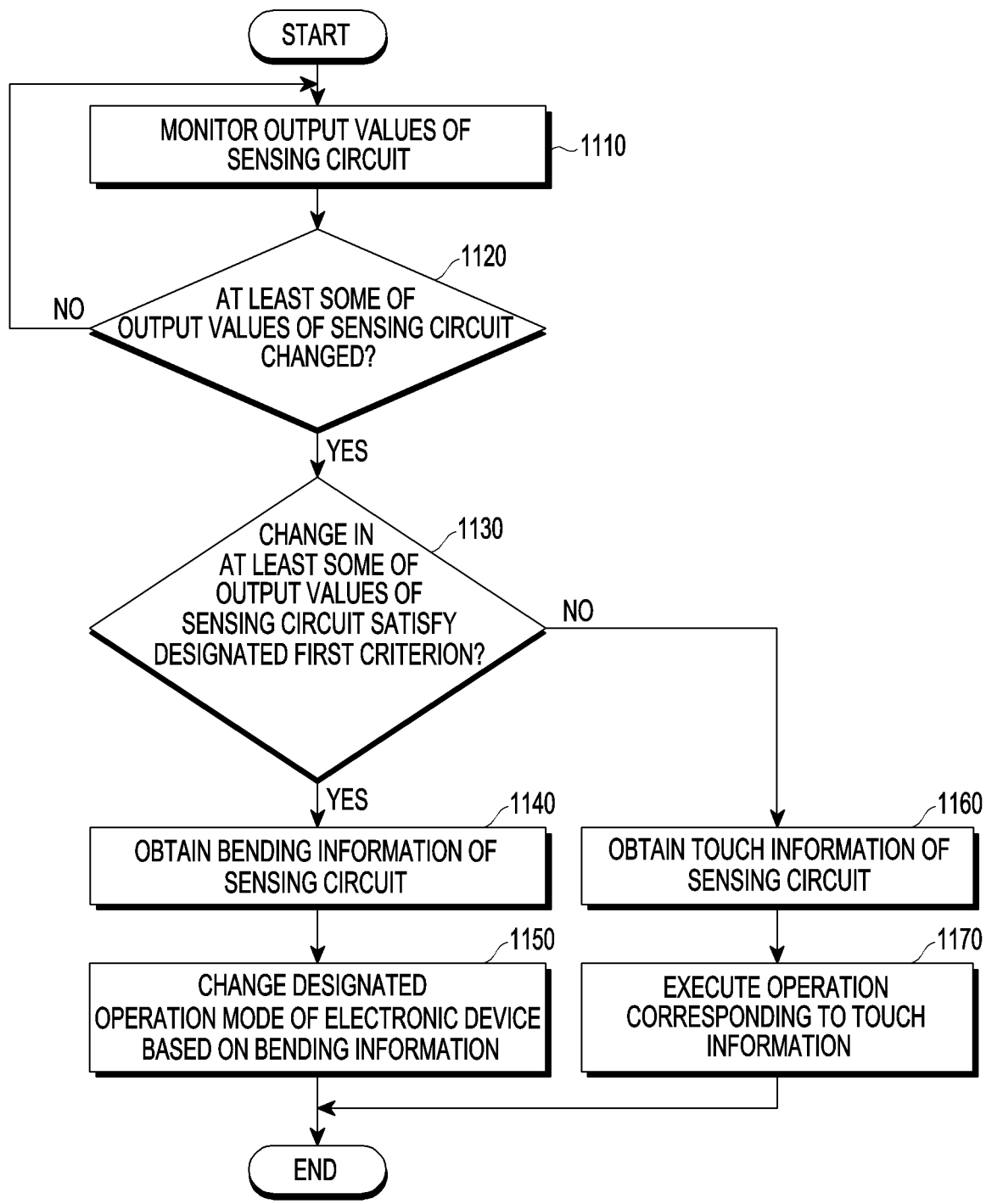
FIG. 11 is a flowchart illustrating operations of an electronic device according to various embodiments.

FIG. 11 is a flowchart illustrating operations of an electronic device according to various embodiments. The operations may include operations 1110 through 1170. Each of the operations may be performed by at least one of an electronic device (e.g., the electronic device 101), at least one processor (e.g., the processor 120) of the electronic device, or a controller (e.g., a combination of the processor 120 and a power management module (e.g., the power management module 188)) of the electronic device. In an embodiment, at least one of operations 1110 through 1170 may be omitted, an order of some of operations 510 through 590 may be changed, or other operations may be added.

Referring to FIG. 11, the electronic device may determine bending of the sensing circuit based on at least some output values of the sensing circuit and/or a variance of the output values.

In operation 1110, the electronic device may monitor at least some output values of the sensing circuit.

According to an embodiment, the electronic device may monitor at least some output values of the sensing circuit in real time or at designated intervals.

According to an embodiment, the output values may be capacitances that may be various forms of values such as a voltage, a current, etc.

In operation 1120, the electronic device may determine whether at least some of the output values of the sensing circuit have been changed.

According to an embodiment, the electronic device may determine whether at least some of the output values of the sensing circuit have changed to values in a first range (e.g., out of a threshold range). For example, when at least some of the output values of the sensing circuit are changed to values in the designated first range, the electronic device may determine that at least some of the output values of the sensing circuit have been changed.

According to an embodiment, when the electronic device is bent and thus the sensing circuit is compressed, areas of overlapping portions between first electrodes and a plurality of second electrodes included in a bending region of the sensing circuit may be reduced and output values of the sensing circuit may be reduced based on reduction of the areas.

According to an embodiment, when the electronic device is bent and thus the sensing circuit is stretched, the areas of the overlapping portions between first electrodes and a plurality of second electrodes included in the bending region of the sensing circuit may be enlarged and the output values of the sensing circuit may increase based on enlargement of the areas.

According to an embodiment, when the electronic device determines that the at least some of the output values of the sensing circuit are changed, the electronic device may execute operation 1130; otherwise, the electronic device may perform operation 1110 again.

In operation 1130, the electronic device may determine whether the change in the at least some of the output values of the sensing circuit satisfies a designated first criterion.

According to an embodiment, the first criterion may be a criterion for determining bending of the sensing circuit. For example, the first criterion may include at least one of a magnitude of the changed output values, the number of changed output values, an area of a region of the sensing circuit from which the changed output values are output (also referred to as an area of a region of the sensing circuit corresponding to the changed output values), or a shape of the region of the sensing circuit from which the output values are output).

According to an embodiment, when the changed output values of the sensing circuit are out of the designated first range (e.g., out of the threshold range), when the number of changed output values of the sensing circuit is greater than or equal to a designated number, when the area of the region of the sensing circuit corresponding to the changed output values of the sensing circuit is greater than or equal to a designated area, and/or the shape of the region of the sensing circuit corresponding to the changed output values of the sensing circuit corresponds to a designated shape, the electronic device may determine that the change in the at least some of the output values of the sensing circuit satisfies the designated first criterion.

In operation 1140, the electronic device may obtain bending information of the sensing circuit.

According to an embodiment, based on the changed output values of the sensing circuit and/or variances of the output values corresponding to the change in the output values of the sensing circuit, the electronic device may identify bending information of the sensing circuit. For example, the electronic device may store bending information corresponding to designated output values and/or a variance of the designated output values, respectively. For example, the bending information may include at least one of a bending position, a bending strength, a bending angle, a bending direction, or a bending area. For example, the electronic device may identify a bending position, a bending direction, and/or a bending area of the sensing circuit, based on a changed position and/or distribution, etc., of the capacitance between the first electrodes and the second electrodes. For example, the electronic device may identify a bending strength and/or a bending angle of the sensing circuit, based on the capacitance between the first electrodes and the second electrodes and/or a variance of the capacitance.

In operation 1150, the electronic device may change a designated operation mode thereof based on the bending information.

According to an embodiment, the electronic device may designate (or store) information of an operation mode corresponding to each bending information.

For example, the electronic device may execute an operation mode such as unlocking of the electronic device, activation of a designated sensor of the electronic device, based on each piece of bending information. For example, the electronic device may execute an operation mode of displaying a screen corresponding to each piece of bending information displayed on a display device of the electronic device. For example, the electronic device may execute an operation mode of displaying a user interface having a size corresponding to each piece of bending information.

In operation 1160, the electronic device may obtain touch information of the sensing circuit.

According to an embodiment, based on the changed output values of the sensing circuit and/or variances of the output values corresponding to the change in the output values of the sensing circuit, the electronic device may identify the touch information of the sensing circuit. For example, the touch information may include at least one of a touch position, a touch area, or a touch duration.

In operation 1170, the electronic device may perform an operation corresponding to each piece of touch information.

According to an embodiment, an operation corresponding to each piece of touch information may be designated in the electronic device.

For example, the electronic device may execute or terminate an application corresponding to the touch information.

Figure 12A:
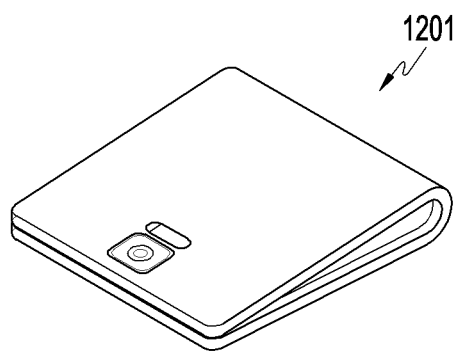
FIG. 12A is a diagram for describing an operation of controlling an operation mode of an electronic device, according to various embodiments.
Figure 12B:
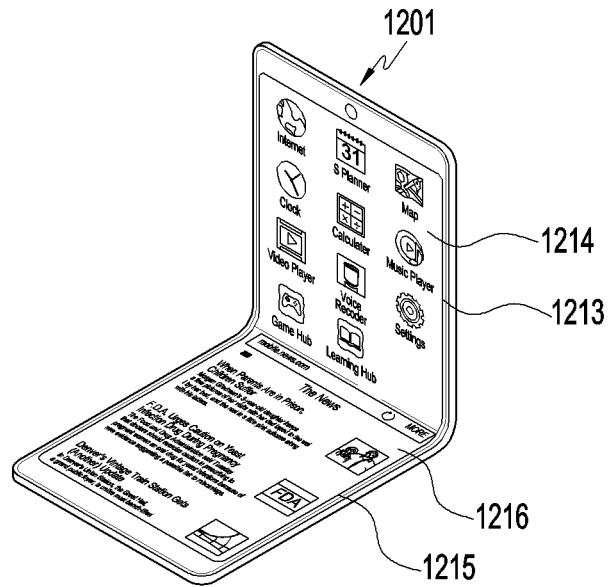
FIG. 12B is a diagram for describing an operation of controlling an operation mode of an electronic device, according to various embodiments.
Figure 12C:
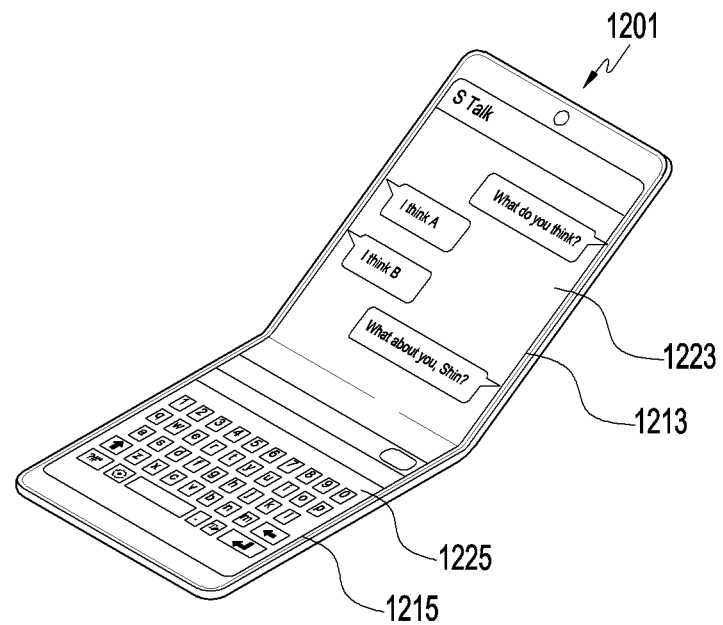
FIG. 12C is a diagram for describing an operation of controlling an operation mode of an electronic device, according to various embodiments.
Figure 12D:
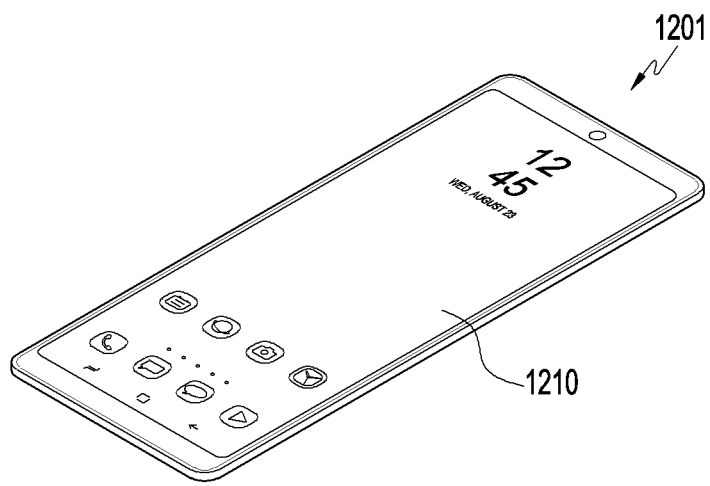
FIG. 12D is a diagram for describing an operation of controlling an operation mode of an electronic device, according to various embodiments.

FIG. 12A is a diagram for describing an operation of controlling an operation mode of an electronic device (e.g., the electronic device 101 or a processor of the electronic device 101), according to various embodiments. FIG. 12B is a diagram for describing an operation of controlling an operation mode of an electronic device (e.g., the electronic device 101 or a processor of the electronic device 101), according to various embodiments. FIG. 12C is a diagram for describing an operation of controlling an operation mode of an electronic device (e.g., the electronic device 101 or a processor of the electronic device 101), according to various embodiments. FIG. 12D is a diagram for describing an operation of controlling an operation mode of an electronic device (e.g., the electronic device 101 or a processor of the electronic device 101), according to various embodiments.

According to an embodiment, the electronic device may designate (store) an operation mode corresponding to each of designated bending angles.

As shown in FIG. 12A, when the electronic device 1201 is bent at 0 degree, the electronic device 1201 may execute a sleep mode corresponding to 0 degree. For example, the sleep mode may be set in which a screen of a display device of the electronic device is automatically turned off.

As shown in FIG. 12B, when the electronic device 1201 is bent at 90 degrees, the electronic device 1201 may execute a dual display mode corresponding to 90 degrees. For example, the dual display mode may be set in which a first screen 1214 is displayed in a first region 1213 of the display device and a second screen 1216 is displayed in a second region 1215 of the display device, as shown in FIG. 12B.

As shown in FIG. 12C, when the electronic device 1201 is bent at 135 degrees, the electronic device 1201 may execute an operation mode corresponding to 135 degrees, which combines the dual display mode with a typing mode. For example, the typing mode may be set in which a virtual keypad is displayed to allow a user to input a character. For example, the operation mode combining the dual display mode with the typing mode may be set in which a first screen 1223 is displayed in the first region 1213 of the display device and a virtual keypad 1225 is displayed in the second region 1215 of the display device, as shown in FIG. 12C.

As shown in FIG. 12D, when the electronic device 1201 is unbent at 180 degrees, the electronic device 1201 may execute a wake-up mode corresponding to 180 degrees. For example, the wake-up mode may be set in which the screen of the display device 1210 of the electronic device 1201 is automatically turned on.

Figure 13A:
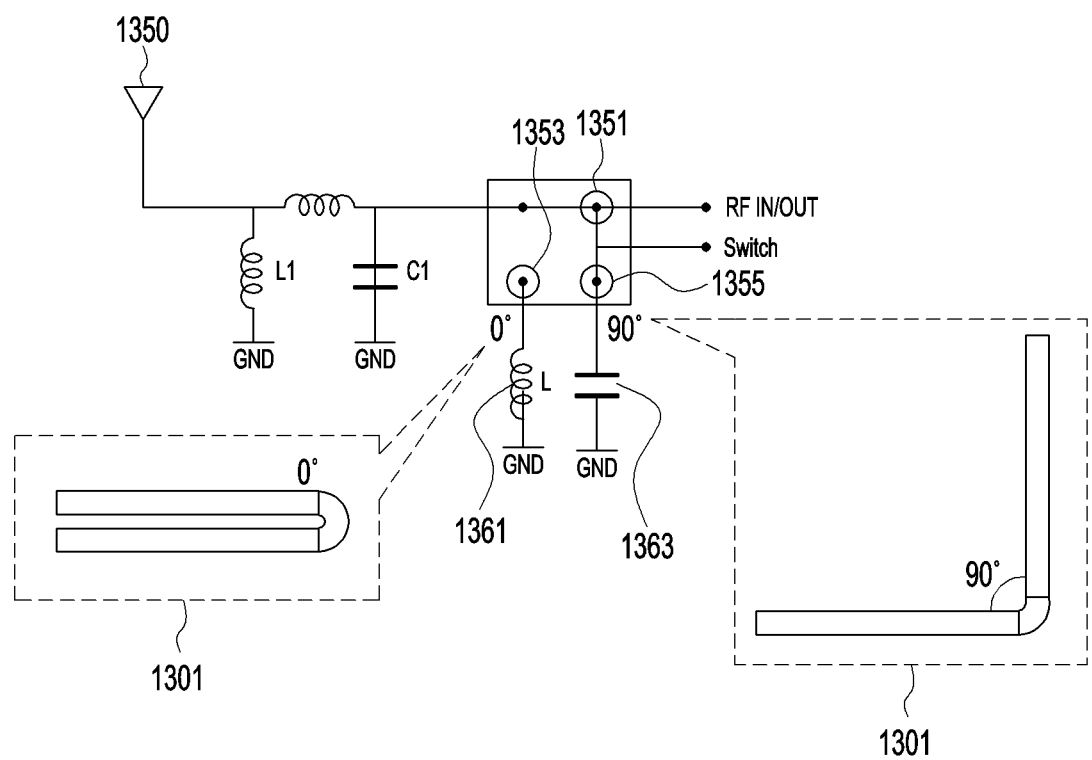
FIG. 13A is a diagram for describing an operation of controlling an operation mode of an electronic device, according to various embodiments.
Figure 13B:
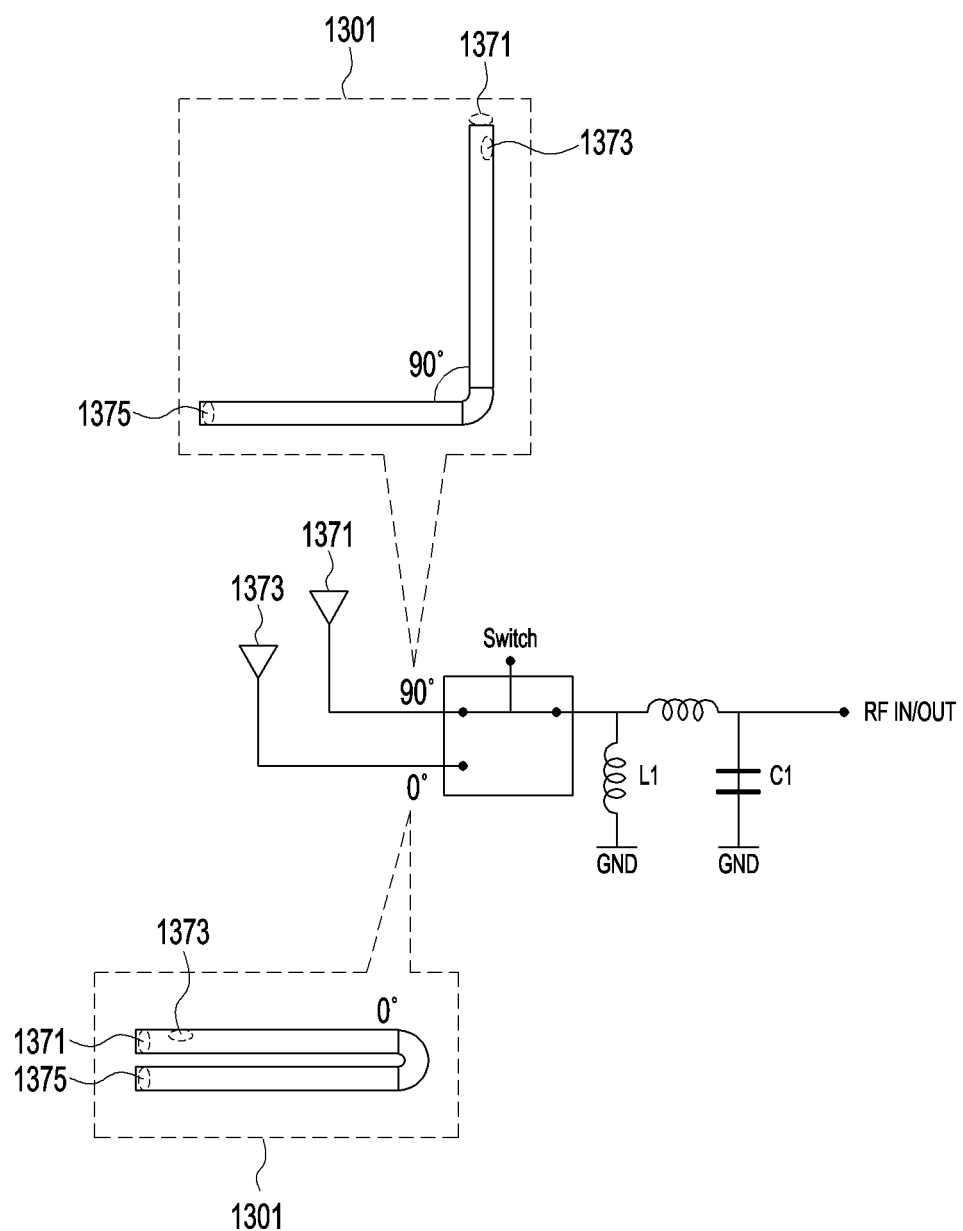
FIG. 13B is a diagram for describing an operation of controlling an operation mode of an electronic device, according to various embodiments.

FIG. 13A is a diagram for describing an operation of controlling an operation mode of an electronic device (e.g., the electronic device 101 or a processor of the electronic device 101), according to various embodiments. FIG. 13B is a diagram for describing an operation of controlling an operation mode of an electronic device (e.g., the electronic device 101 or a processor of the electronic device 101), according to various embodiments.

Referring to FIG. 13A, an electronic device 1301 may change an operation mode such that an antenna operates with optimal performance. For example, the electronic device 1301 may operate with an antenna circuit corresponding to bending of the electronic device 1301, thereby preventing degradation of the performance of an antenna. For example, when the electronic device 1301 is bent at 0 degree and when the electronic device 1301 is bent at 90 degrees, the antenna may operate in antenna circuits having at least some different components through a switching operation. For example, when the electronic device 1301 is bent at 0 degree, a switching operation may be performed such that a first contact point 1351 of radio frequency (RF) IN/OUT of a circuit is connected with a second contact point 1353 connected with a first inductor 1361. For example, when the electronic device 1301 is bent at 90 degree, a switching operation may be performed such that the first contact point 1351 of RF IN/OUT of the circuit is connected with a third contact point 1355 connected with a first capacitor 1363.

Referring to FIG. 13B, the electronic device 1301 may change an operation mode such that an antenna capable of operating with optimal performance among a plurality of antennas operates. For example, the electronic device 1301 may operate with an antenna corresponding to bending of the electronic device 1301, thereby efficiently using the antenna. For example, when the electronic device 1301 is bent at 0 degree, a corresponding first antenna 1373 may be designated, and when the electronic device 1301 is bent at 90 degrees, a corresponding second antenna 1371 may be designated. For example, when the electronic device 1301 is bent at 0 degree, the first antenna 1373 located farthest from the third antenna 1375 may be designated to operate, and when the electronic device 1301 is bent at 90 degrees, the second antenna 1371 located farthest from the third antenna 1375 may be designated to operate. For example, when the electronic device 1301 is bent at 0 degree and when the electronic device 1301 is bent at 90 degrees, different antennas may operate through a switching operation.

Figure 14:
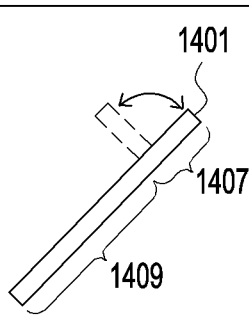
FIG. 14 is a diagram for describing an operation of providing a screen of a touchscreen corresponding to bending of an electronic device, according to various embodiments of the disclosure.

FIG. 14 is a diagram for describing an operation of providing a screen of a touchscreen corresponding to bending of an electronic device (e.g., the electronic device 101), according to various embodiments of the disclosure.

According to an embodiment, based on bending information, an electronic device 1401 may identify a division ratio of an upper part 1407 and a lower part 1409 of a display device 1410 according to bending and determine a screen ratio of the upper part 1407 and the lower part 1409 of the display device based on the division ratio. Referring to FIG. 14, the division ratio of the upper part 1407 and the lower part 1409 of the display device according to bending of the electronic device may be various such as 1:3, 2:3, or 1:1, and the electronic device may display screens corresponding to the division ratio on the upper part 1407 and the lower part 1409 of the display device.

Figure 15A:
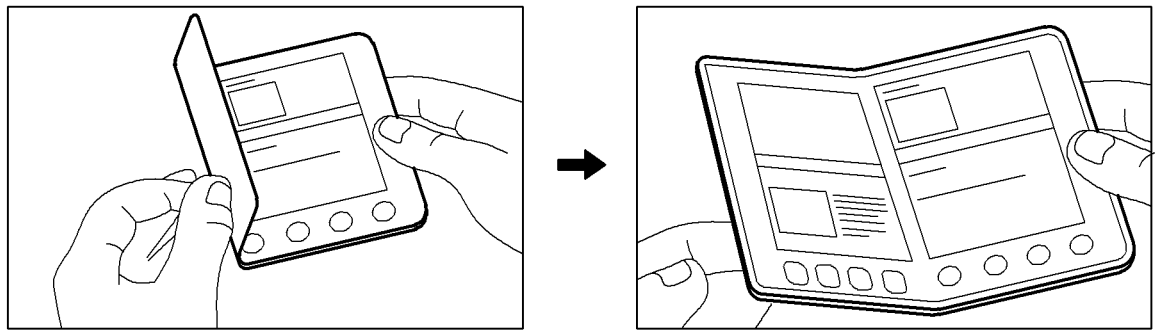
FIG. 15A illustrates an example of an electronic device according to various embodiments.
Figure 15B:
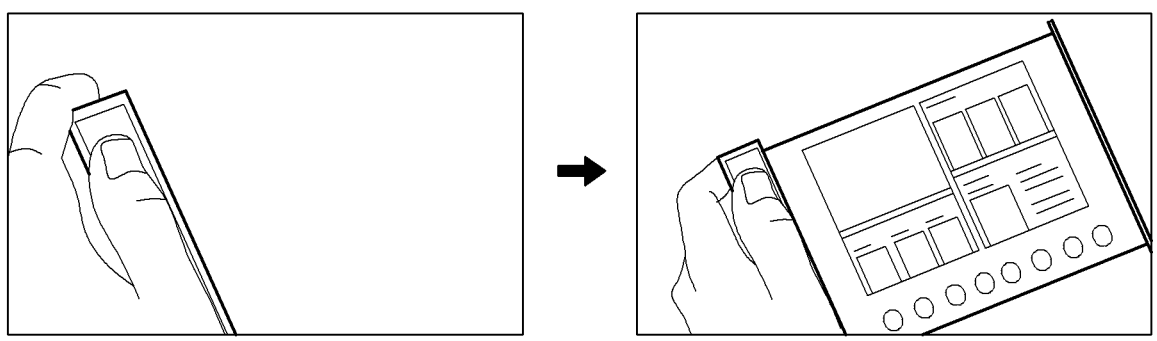
FIG. 15B illustrates an example of an electronic device according to various embodiments.

FIG. 15A illustrates an example of an electronic device (e.g., the electronic device 101), according to various embodiments. FIG. 15B illustrates an example of an electronic device (e.g., the electronic device 101), according to various embodiments.

The electronic device according to the above-described embodiment of FIGS. 3 through 14 may be a flexible (or foldable) electronic device as shown in FIG. 15A or a bendable electronic device such as a rollable electronic device as shown in FIG. 15B.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a storage medium having stored therein instructions which cause, when executed by at least one circuit, the at least one circuit to perform at least one operation, the at least one operation includes identifying output values of the sensing circuit related to a touch or a pressure applied to the sensing circuit of an electronic device, obtaining, when at least some of output values are changed, bending information of the sensing circuit at least based on the changed output values, and changing an operation mode of the electronic device to at least one of designated operation modes, at least based on the bending information of the sensing circuit.

The invention claimed is:

1. An electronic device comprising:
   a flexible housing, wherein the flexible housing is capable of bending by application of an external force;

a sensing circuit disposed on a surface of the flexible housing, the sensing circuit comprising a first plurality of electrodes and a second plurality of electrodes, wherein bending of the flexible housing causes a change in an amount of overlap area between at least one of the first plurality of electrodes and at least one of the second plurality of electrodes;

a processor operatively connected with the sensing circuit; and a memory operatively connected with the processor, wherein the memory stores instructions, when executed, configured to cause the processor to:

identify output values of the sensing circuit related to a touch or pressure applied to the sensing circuit, wherein the output values of the sensing circuit comprise a capacitance value at at least one intersection between the at least one of the first plurality of electrodes and the at least one of the second plurality of electrodes;

determine whether at least some of the output values of the sensing circuit are changed to be out of a threshold range;

obtain, when determining that the at least some of the output values of the sensing circuit are changed to be out of the threshold range, bending information of the sensing circuit at least based on a change in the capacitance value at the at least one intersection; and change an operation mode of the electronic device to at least one of designated operation modes, at least based on the bending information of the sensing circuit.

2. The electronic device of claim 1, wherein the instructions are configured to cause the processor to, when sensing a change in the at least some of the output values of the sensing circuit, determine, at least based on a designated criterion, the changed at least some output values as information of the pressure applied to the sensing circuit or information of a touch input to the sensing circuit.

3. The electronic device of claim 2, wherein the designated criterion comprises at least one of a magnitude of the changed at least some output values, a number of the changed at least some output values, a position of the sensing circuit from which the changed at least some output values are output, an area of a region of the sensing circuit from which the changed at least some output values are output, or a shape of the region of the sensing circuit from which the changed at least some output values are output.

4. The electronic device of claim 1, wherein the instructions are configured to cause the processor to, when a range of output values corresponding to a designated region of the sensing circuit is changed to a designated first range, determine that the pressure based at least on the output values of the first range is applied to the sensing circuit.

5. The electronic device of claim 4, wherein the instructions are configured to cause the processor to, when sensing a change in first output values corresponding to the designated region, after determining that the pressure based at least on the output values of the first range is applied to the sensing circuit, change a designated operation mode of the electronic device based on the changed first output values.

6. The electronic device of claim 1, wherein the bending information comprises at least one of a bending position, a bending strength, a bending angle, a bending direction, or a bending area.

7. The electronic device of claim 1, wherein the memory stores a bending angle of the sensing circuit, which corresponds to each of magnitudes of changed output values.

8. The electronic device of claim 1, wherein the instructions are configured to cause the processor to change the operation mode of the electronic device to at least one of a sleep mode, a dual display mode, a typing mode, or a wake-up mode, at least based on the bending information of the touch circuit.

9. The electronic device of claim 1, further comprising one or more antennas, wherein the instructions are configured to cause the processor to switch a first connection contact point of a circuit connected with the one or more antennas to a second connection contact point.

10. The electronic device of claim 1, further comprising a plurality of antennas, wherein the instructions are configured to cause the processor to change from a mode in which a first antenna among the plurality of antennas operates to a mode in which a second antenna among the plurality of antennas operates.

11. The electronic device of claim 1, wherein the first plurality of electrodes are substantially parallel to each other, and wherein the second plurality of electrodes are substantially parallel to each other and substantially orthogonal to the first plurality of electrodes.

12. The electronic device of claim 1, wherein the change in the capacitance at the at least one intersection is caused by a change in an area of overlap between the at least one of the first plurality of electrodes and the at least one of the second plurality of electrodes.

13. A method for changing an operation mode based on bending information using a sensing circuit, the method comprising:

identifying output values of the sensing circuit related to a touch or pressure applied to the sensing circuit of an electronic device, wherein the output values of the sensing circuit comprise a capacitance value at at least one intersection between at least one of a first plurality of electrodes and at least one of a second plurality of electrodes, wherein the sensing circuit is disposed in a flexible housing capable of bending by application of an external force, and wherein bending of the flexible housing causes a change in overlap area of the at least one of the plurality of electrodes and the at least one of the second plurality of electrodes;

determining whether at least some of the output values of the sensing circuit are changed to be out of a threshold range;

obtaining, when determining that the at least some of the output values of the sensing circuit are changed to be out of the threshold range, bending information of the sensing circuit at least based on a change in the capacitance value at the at least one intersection; and changing an operation mode of the electronic device to at least one of designated operation modes, at least based on the bending information of the sensing circuit.

14. The method of claim 13, further comprising, when sensing a change in the at least some of the output values of the sensing circuit, determining, at least based on a designated criterion, the changed at least some output values as information of the pressure applied to the sensing circuit or information of a touch input to the sensing circuit.

15. A storage medium having stored therein instructions which cause, when executed by at least one circuit, the at least one circuit to perform at least one operation which comprises:

identifying output values of a sensing circuit related to a touch or pressure applied to the sensing circuit of an electronic device, wherein the output values of the sensing circuit comprise a capacitance value at at least one intersection between at least one of a first plurality of electrodes and at least one of a second plurality of electrodes, wherein the sensing circuit is disposed in a flexible housing capable of bending by application of an external force, and wherein bending of the flexible housing causes a change in overlap area of the at least one of the plurality of electrodes and the at least one of the second plurality of electrodes;

determining whether at least some of the output values of the sensing circuit are changed to be out of a threshold range;

obtaining, when determining that at least some of the output values of the sensing circuit are changed to be out of the threshold range, bending information of the sensing circuit at least based on a change in the capacitance value at the at least one intersection; and changing an operation mode of the electronic device to at least one of designated operation modes, at least based on the bending information of the sensing circuit.

* * * * *